(12) United States Patent
     Takahashi et al.

(10) Patent No.:    US 10,523,891 B2
(45) Date of Patent:    Dec. 31, 2019

(54) PROJECTION SYSTEM AND APPARATUS UNIT TO IMPLEMENT NEW USE FORM OF PROJECTOR

(71) Applicant: SONY CORPORATION, Tokyo (JP)

(72) Inventors: Naomasa Takahashi, Chiba (JP); Tatsuya Yamazaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/747,483

(22) PCT Filed: Jul. 1, 2016

(86) PCT No.: PCT/JP2016/069624
§ 371 (c)(1),
(2) Date: Jan. 25, 2018

(87) PCT Pub. No.: WO2017/033574
PCT Pub. Date: Mar. 2, 2017

(65) Prior Publication Data
US 2018/0227536 A1    Aug. 9, 2018

(30) Foreign Application Priority Data
Aug. 21, 2015   (JP) .................................. 2015-163744

(51) Int. Cl.
*G03B 21/14*    (2006.01)
*G03B 31/00*    (2006.01)
(Continued)

(52) U.S. Cl.
CPC ............ *H04N 5/607* (2013.01); *G03B 21/14* (2013.01); *G03B 31/00* (2013.01); *H04N 5/74* (2013.01);
(Continued)

(58) Field of Classification Search
CPC ...................................................... G03B 31/00
See application file for complete search history.

(56) References Cited

U.S. PATENT DOCUMENTS

2005/0271230 A1    12/2005  Sasaki
2006/0077543 A1*    4/2006  Miyoshi ............... H04N 13/133
                                                  359/407
(Continued)

FOREIGN PATENT DOCUMENTS

CN        1720760 A    1/2006
EP        1571870 A1   9/2005
(Continued)

OTHER PUBLICATIONS

International Search Report and Written Opinion of PCT Application No. PCT/JP2016/069624, dated Sep. 20, 2016, 11 pages.

*Primary Examiner* — Paulos M Natnael
(74) *Attorney, Agent, or Firm* — Chip Law Group

(57) ABSTRACT

A projection system of the disclosure includes an apparatus unit and a controller. The apparatus unit includes a speaker section, a projector section, and an imaging section. The speaker section includes one or more speakers. The imaging section images a projection screen provided by the projector section. The controller controls a sound output state of the speaker on a basis of information indicating an installation state of the apparatus unit. The information is estimated on a basis of a captured image obtained by the imaging section.

7 Claims, 31 Drawing Sheets

(51) Int. Cl.
  *H04N 9/31* (2006.01)
  *G03B 21/00* (2006.01)
  *H04N 5/60* (2006.01)
  *H04N 5/74* (2006.01)
  *H04R 1/02* (2006.01)
  *H04R 1/40* (2006.01)
  *H04R 3/00* (2006.01)
  *H04R 3/12* (2006.01)
  *H04R 5/02* (2006.01)
  *H04S 5/02* (2006.01)

(52) U.S. Cl.
  CPC ............ *H04N 9/3147* (2013.01); *H04R 1/02* (2013.01); *H04R 1/028* (2013.01); *H04R 1/40* (2013.01); *H04R 3/00* (2013.01); *H04R 3/12* (2013.01); *H04R 5/02* (2013.01); *H04S 5/02* (2013.01); *G03B 21/00* (2013.01); *H04R 2499/15* (2013.01)

(56) References Cited

U.S. PATENT DOCUMENTS

| | | | |
|---|---|---|---|
| 2006/0082879 A1* | 4/2006 | Miyoshi | H04N 13/218 359/462 |
| 2006/0149401 A1* | 7/2006 | Chung | H04L 12/2803 700/94 |
| 2006/0149402 A1* | 7/2006 | Chung | H04S 7/307 700/94 |
| 2007/0273845 A1* | 11/2007 | Birmingham | G03B 21/008 353/101 |
| 2010/0171930 A1* | 7/2010 | Kurosawa | G03B 21/26 353/30 |
| 2011/0096136 A1* | 4/2011 | Liu | H04N 7/144 348/14.07 |
| 2013/0163952 A1* | 6/2013 | Ni | H04N 21/8106 386/230 |
| 2015/0138240 A1* | 5/2015 | Hiranuma | H04N 9/3185 345/634 |
| 2017/0272698 A1* | 9/2017 | Liu | G06T 3/4038 |

FOREIGN PATENT DOCUMENTS

| | | |
|---|---|---|
| JP | 2004-193811 A | 7/2004 |
| JP | 2006-094186 A | 4/2006 |
| JP | 2009-229939 A | 10/2009 |
| JP | 2011-182077 A | 9/2011 |
| JP | 2014-160133 A | 9/2014 |
| JP | 2015-154370 A | 8/2015 |
| KR | 10-2005-0084875 A | 8/2005 |
| WO | 2004/054314 A1 | 6/2004 |

* cited by examiner

[FIG. 1]
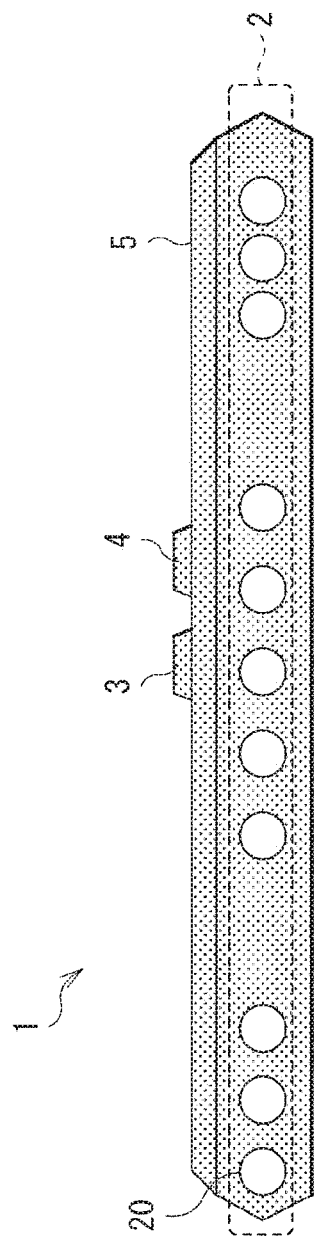

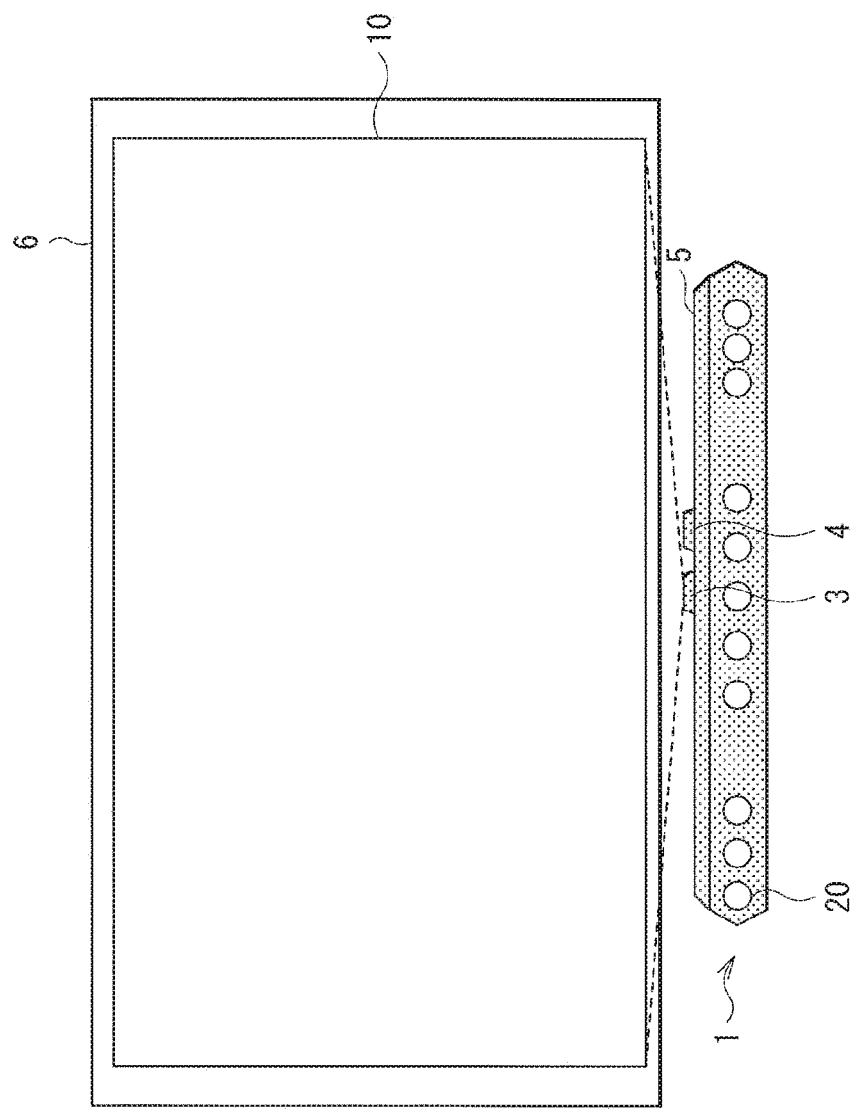

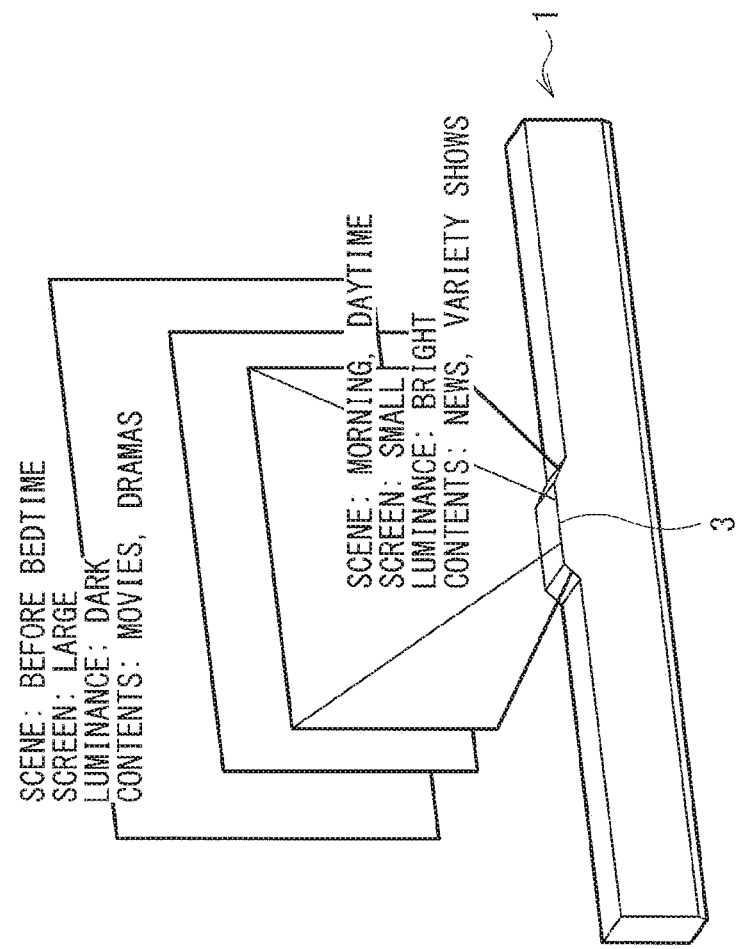

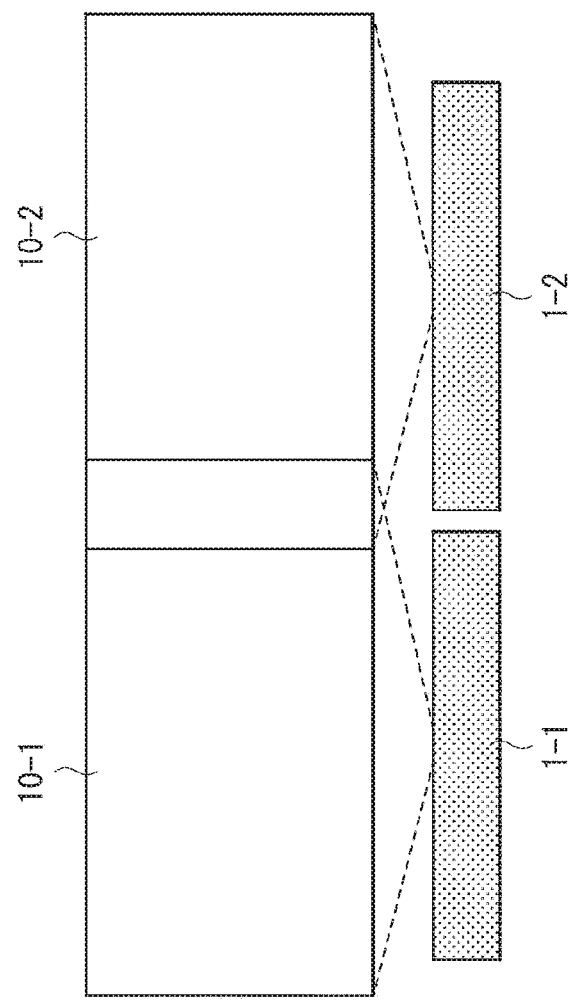
[FIG. 4]

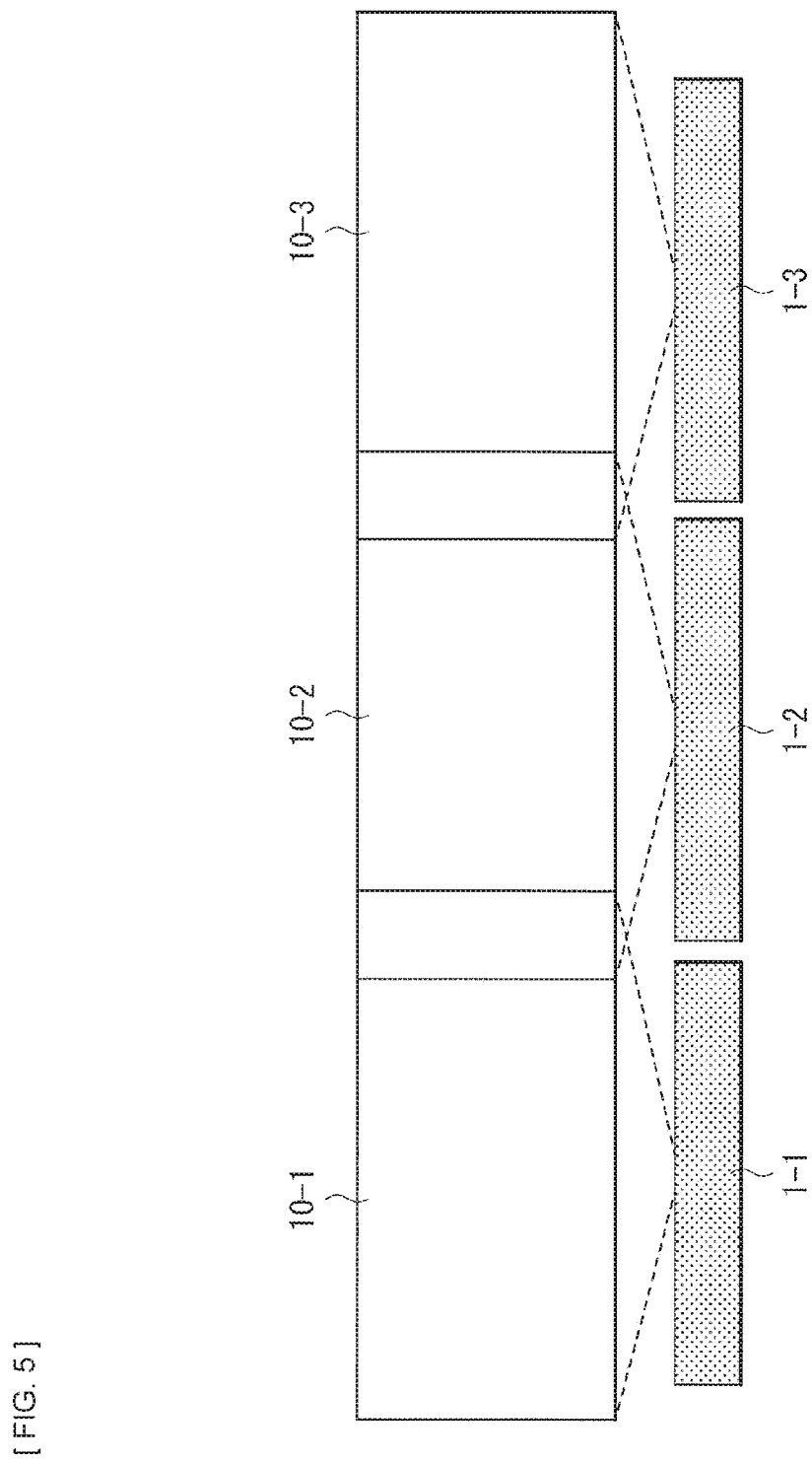

[FIG. 6]
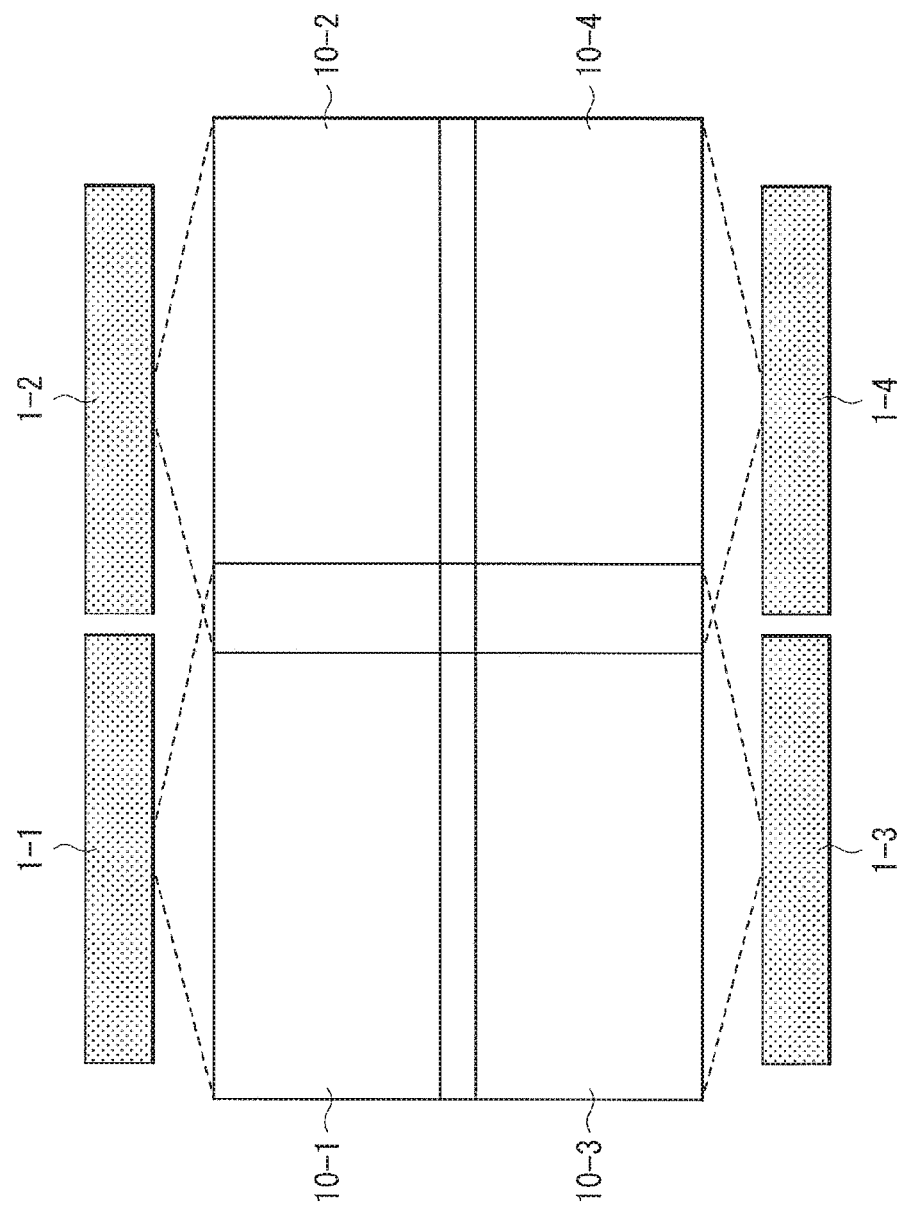

[ FIG. 7 ]
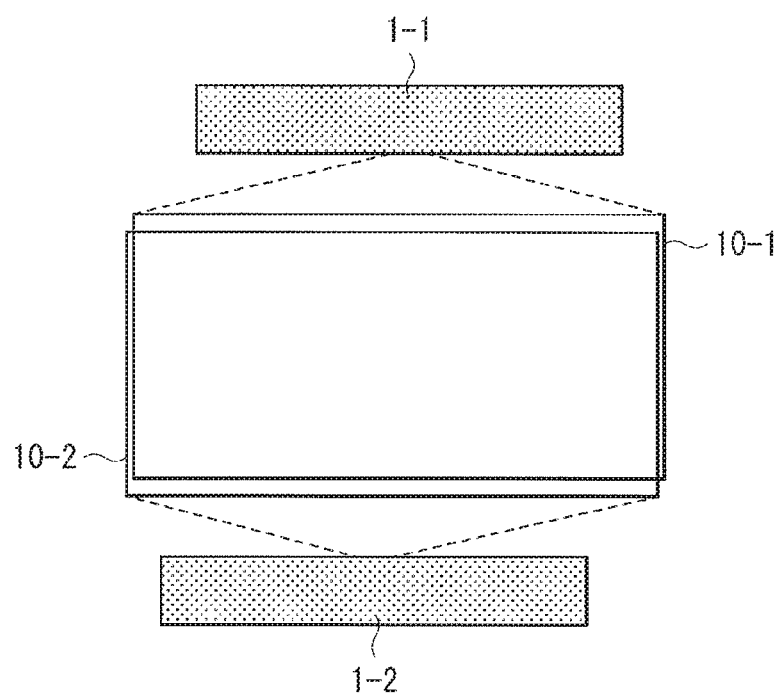

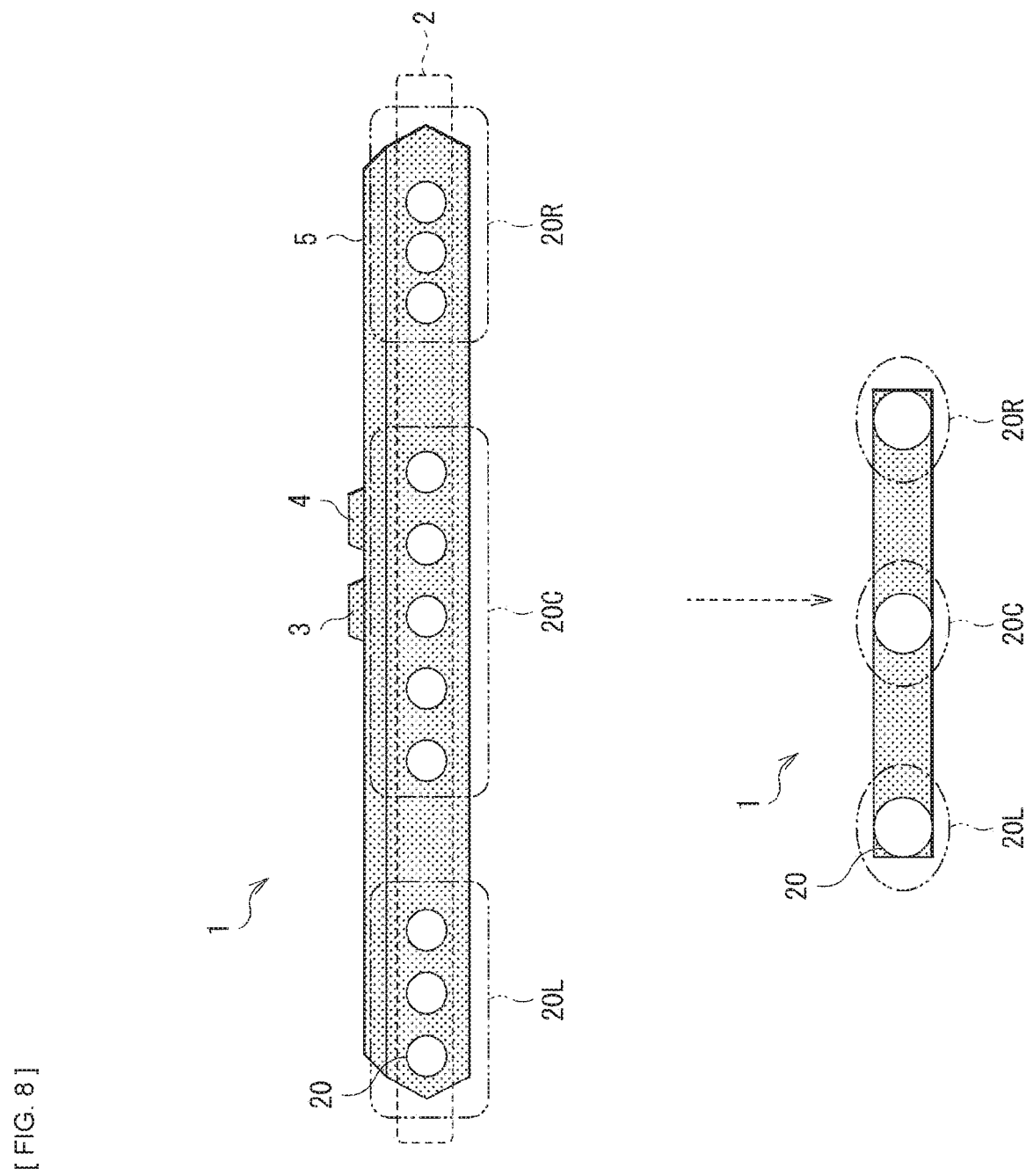

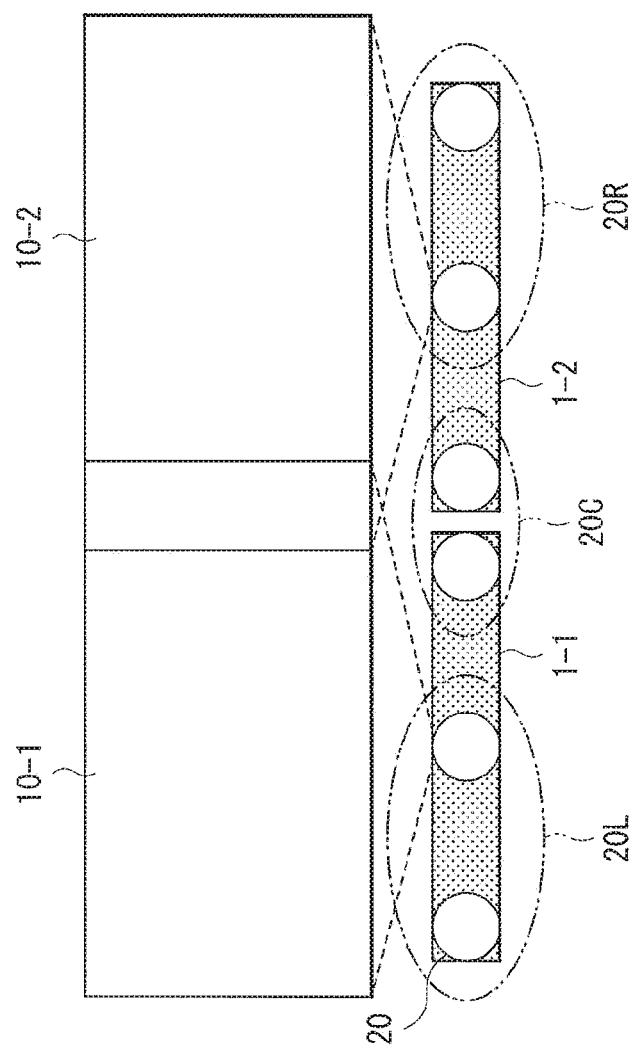
[FIG. 9]

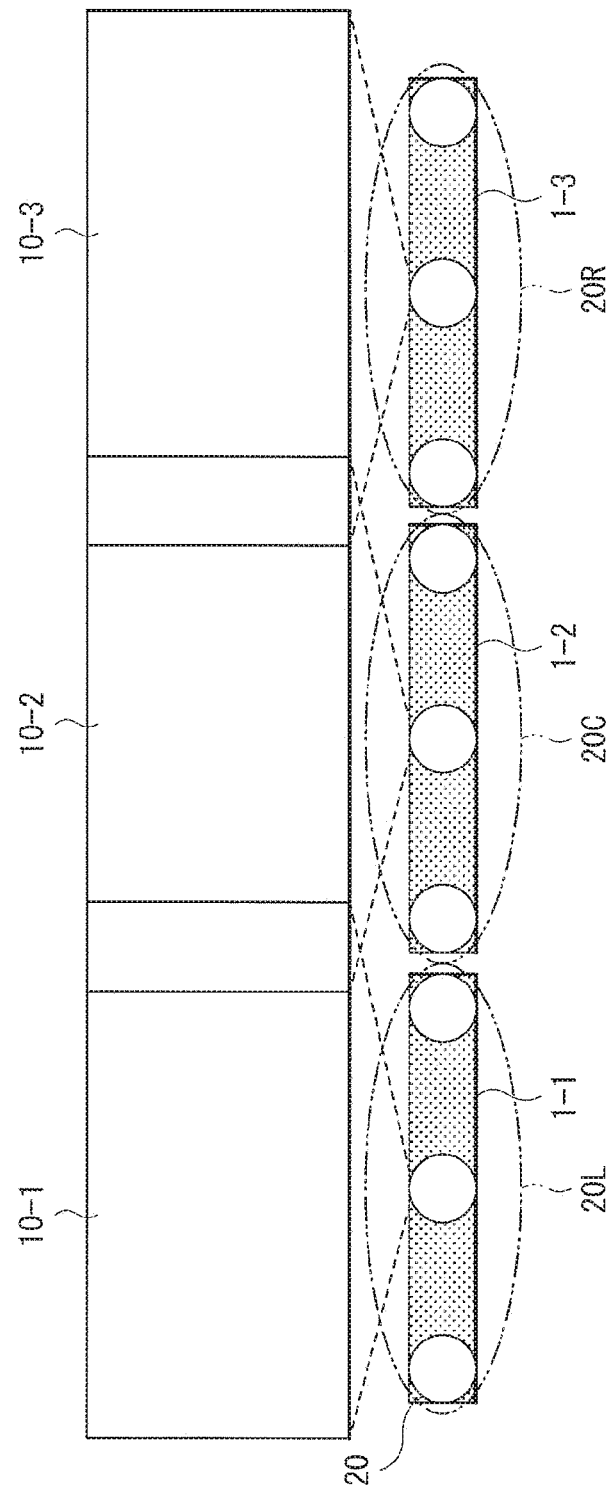

[ FIG. 11 ]
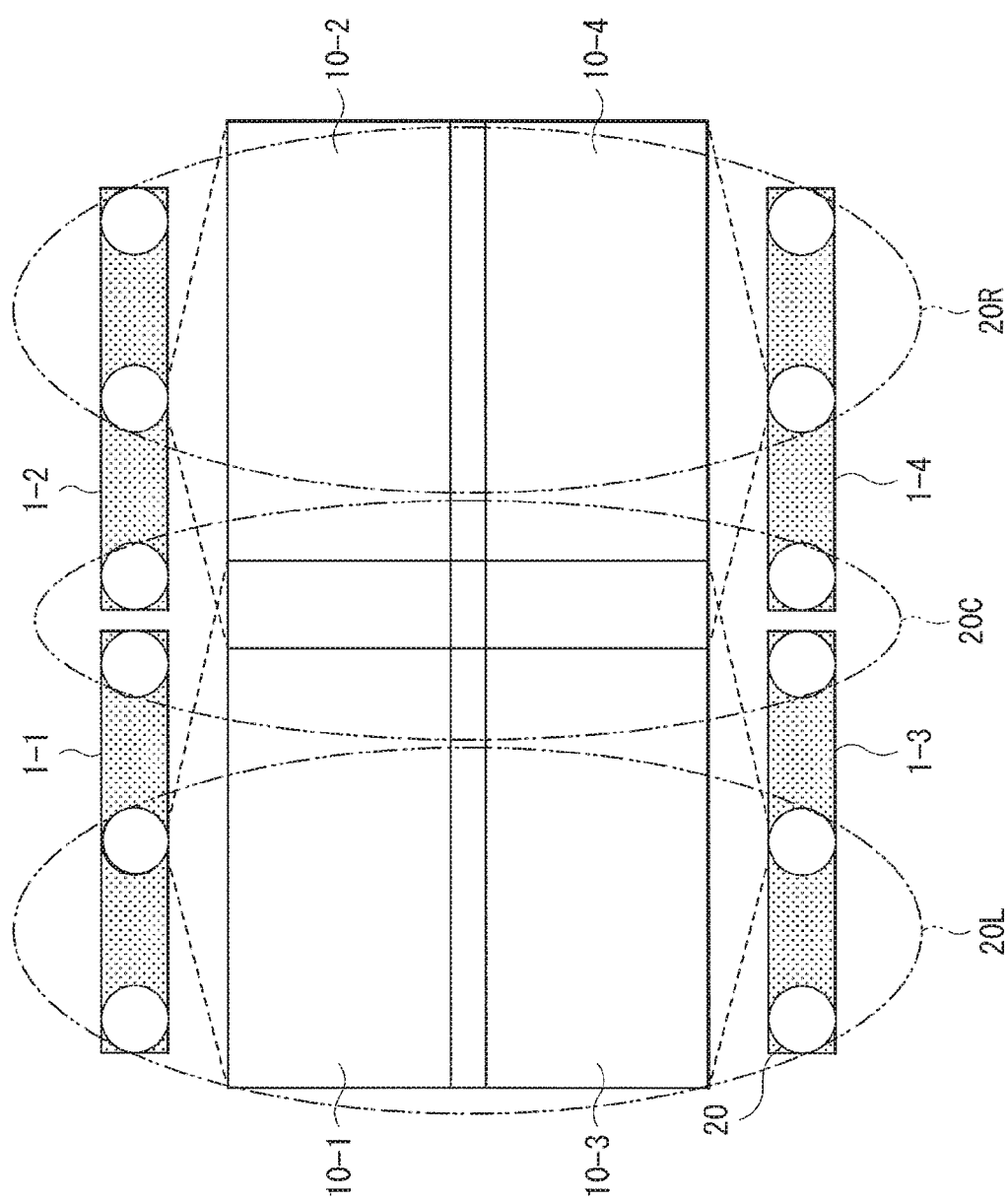

[ FIG. 12 ]
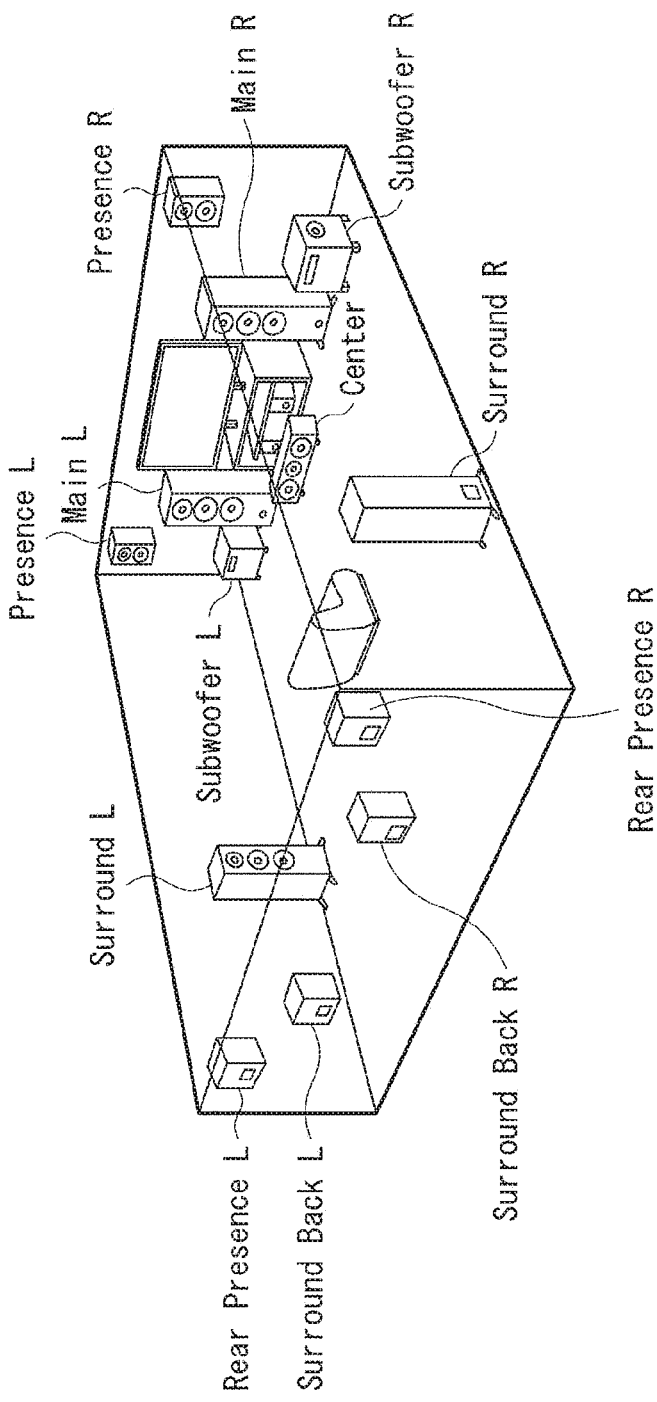

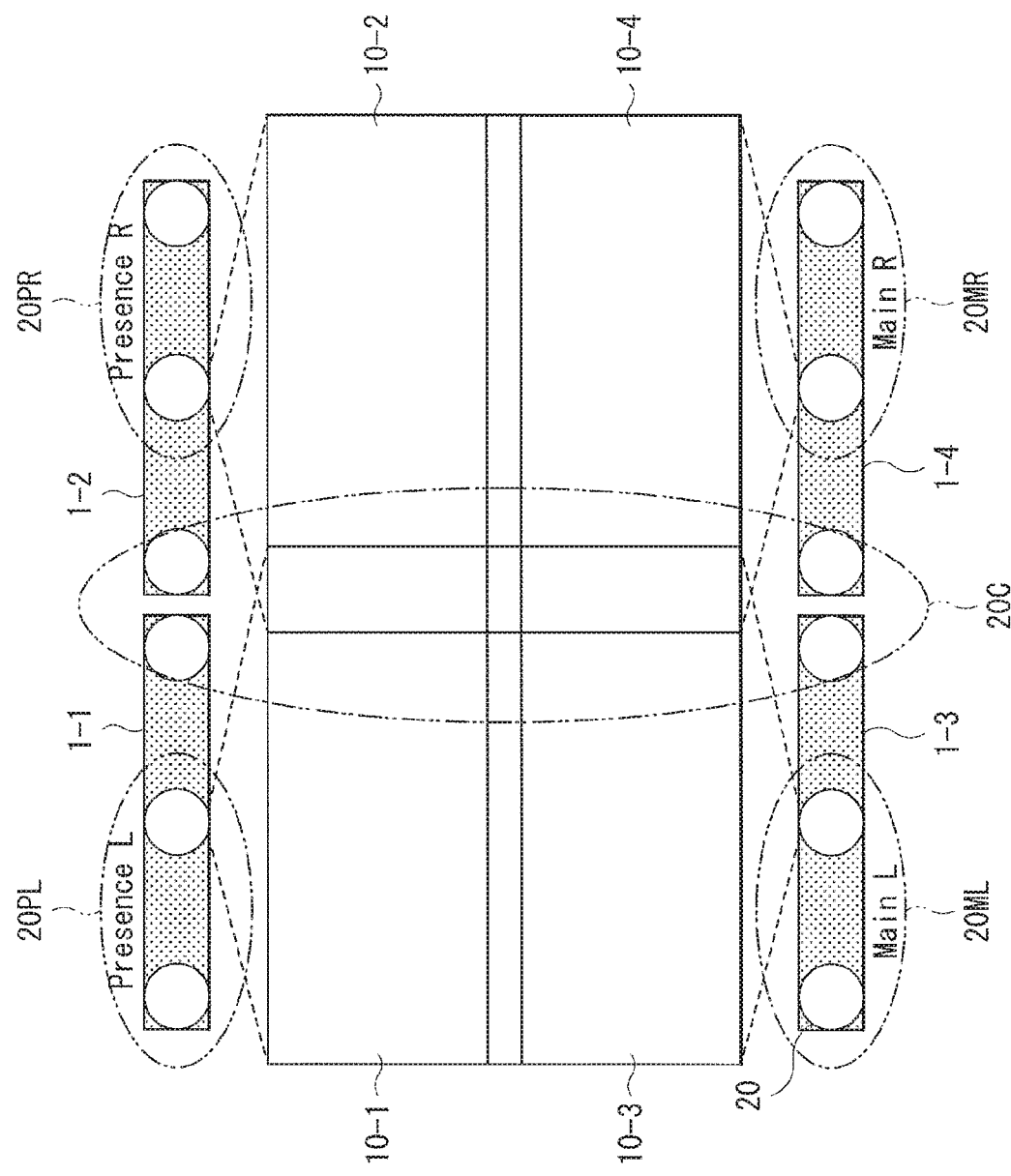
[FIG. 13]

[ FIG. 14 ]
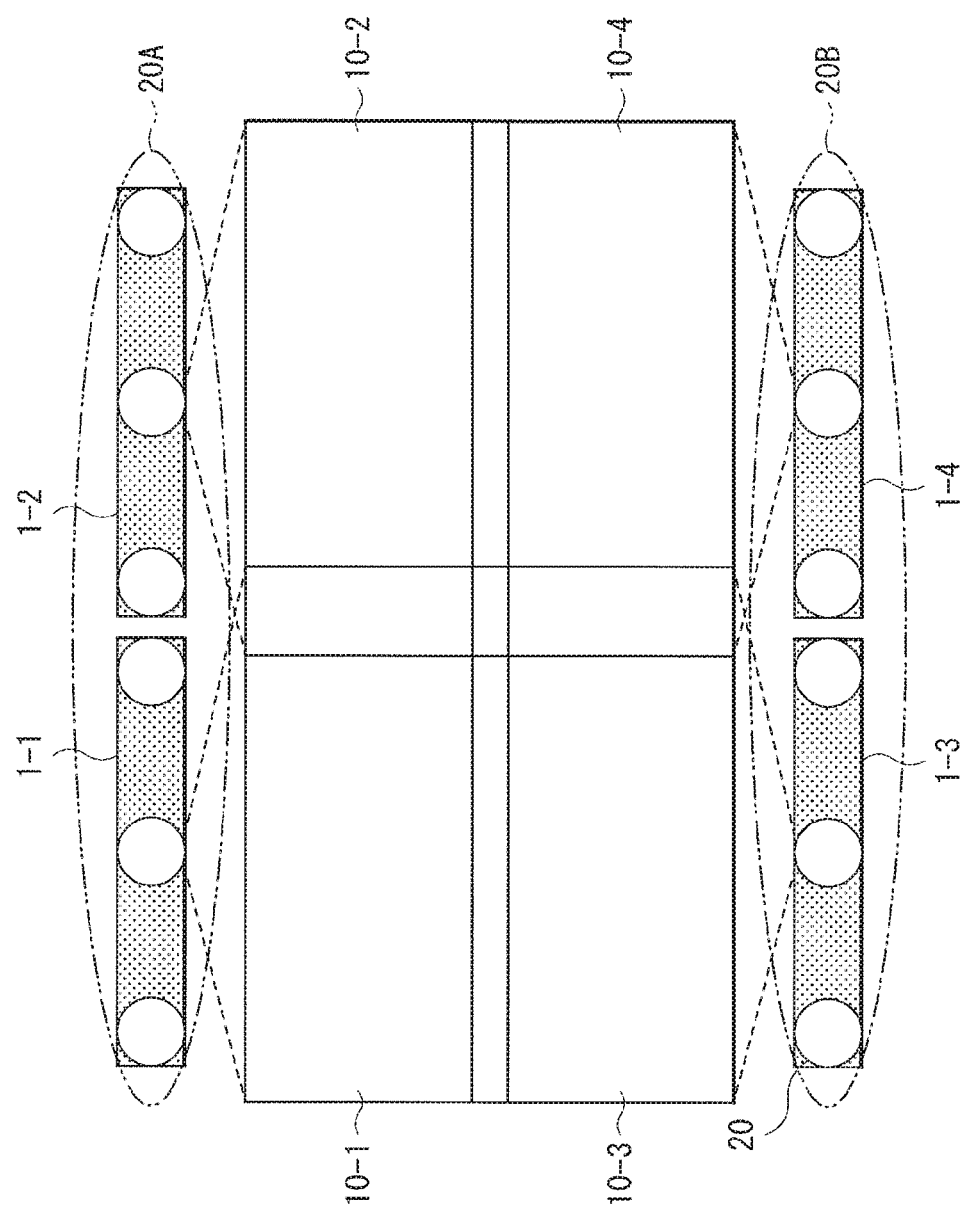

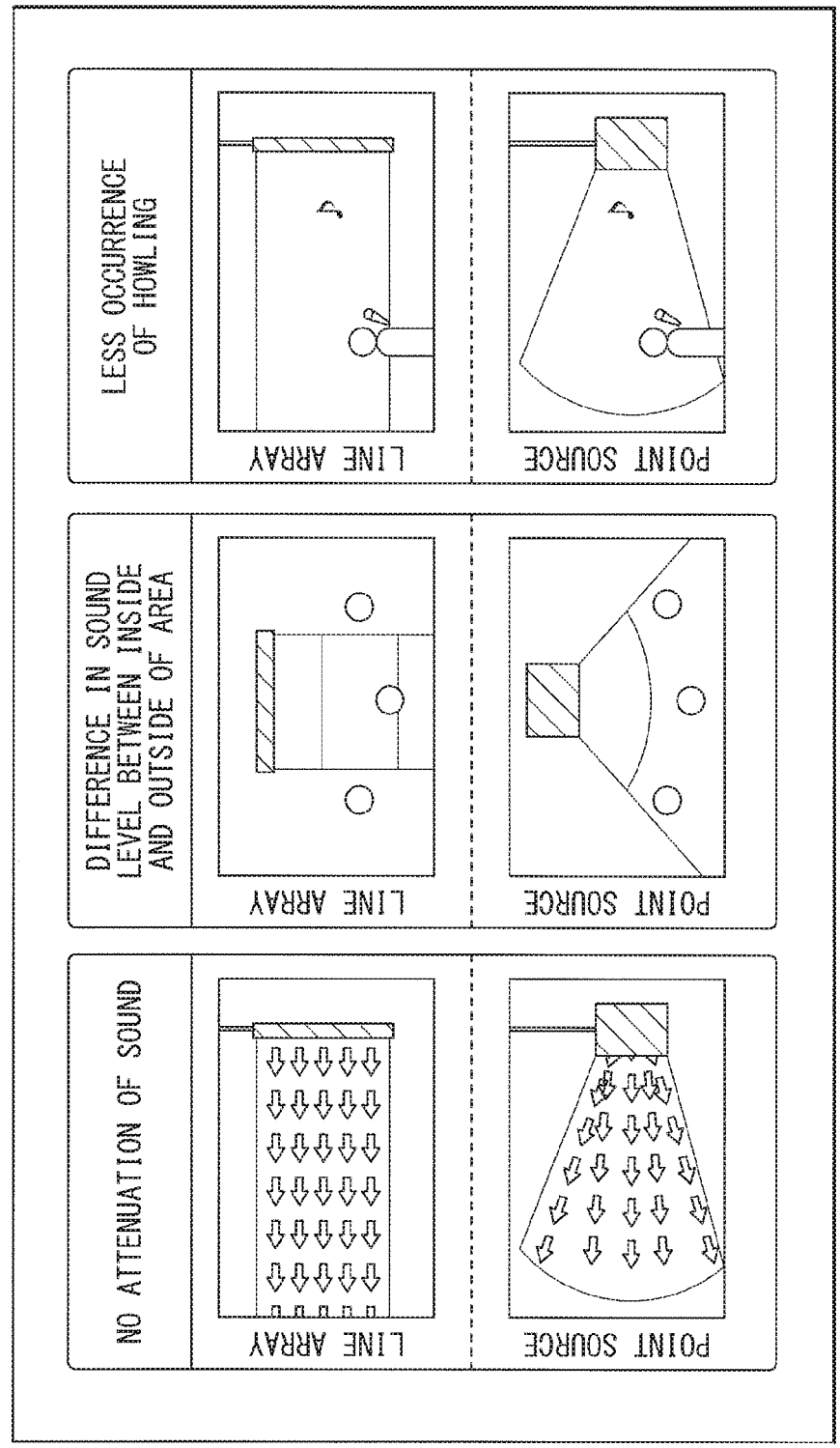
[FIG. 15]

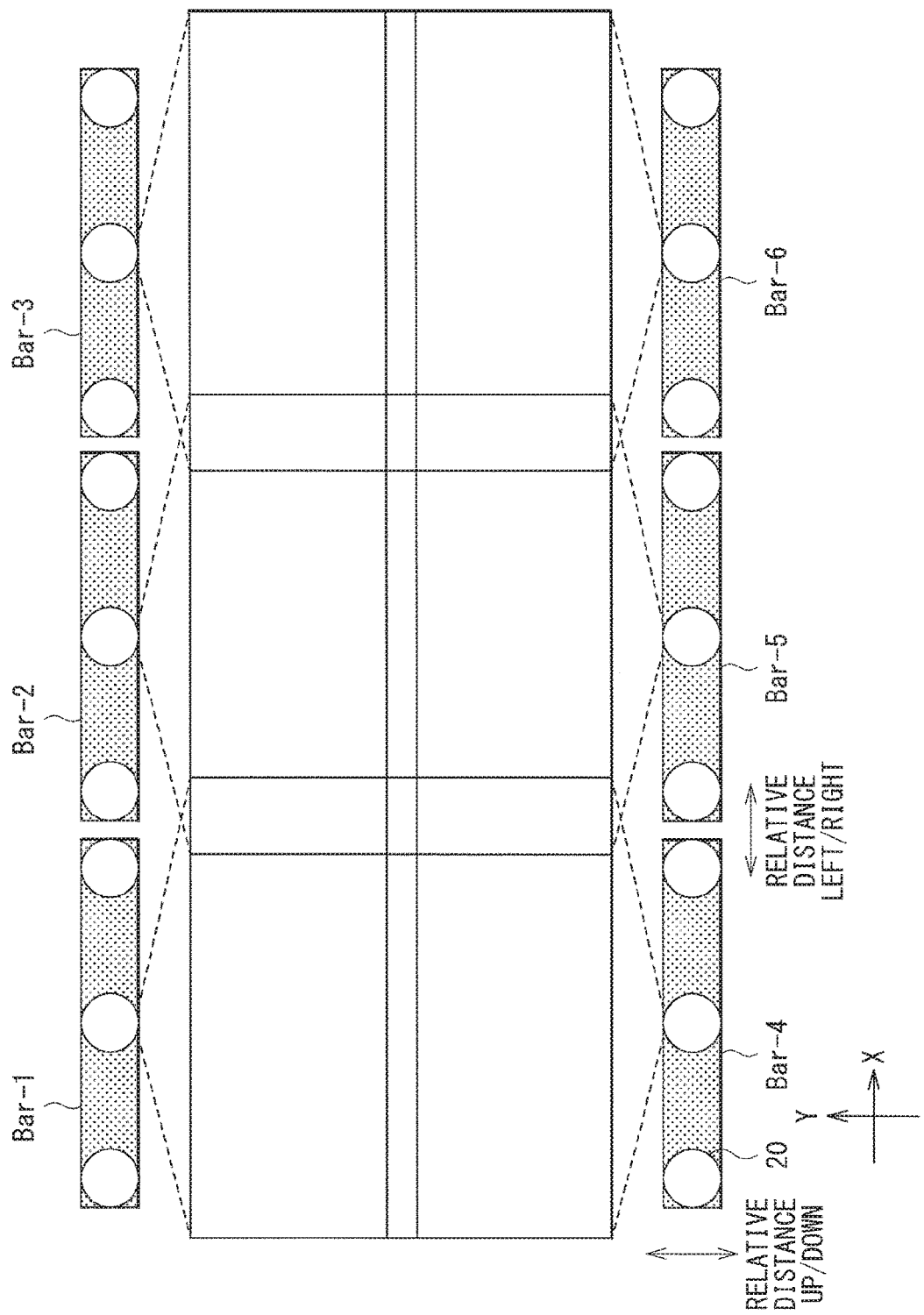
[FIG. 16]

[ FIG. 17 ]

| | X-AXIS POSITION (LEFT/RIGHT) | Y-AXIS POSITION (UP/DOWN) | MOUNTED SP Ch | RELATIVE DISTANCE (LEFT/RIGHT) (cm) | RELATIVE DISTANCE (UP/DOWN) (cm) | ROLLING (DEGREE) |
|---|---|---|---|---|---|---|
| Bar-1 | None/Bar-2 | None/Bar-4 | 3 | 0/5.3 | 0/64.5 | 182 |
| Bar-2 | Bar-1/Bar-3 | None/Bar-5 | 3 | 5.3/4.3 | 0/63.2 | 179 |
| Bar-3 | Bar2/None | None/Bar-6 | 3 | 4.3/0 | 0/62.5 | 181 |
| Bar-4 | None/Bar-5 | Bar-1/None | 3 | 0/1.9 | 64.5/0 | 2 |
| Bar-5 | Bar-4/Bar-6 | Bar-2/None | 3 | 1.9/2.3 | 63.2/0 | -1 |
| Bar-6 | Bar-5/None | Bar-3/None | 3 | 2.3/0 | 62.5/0 | 0 |

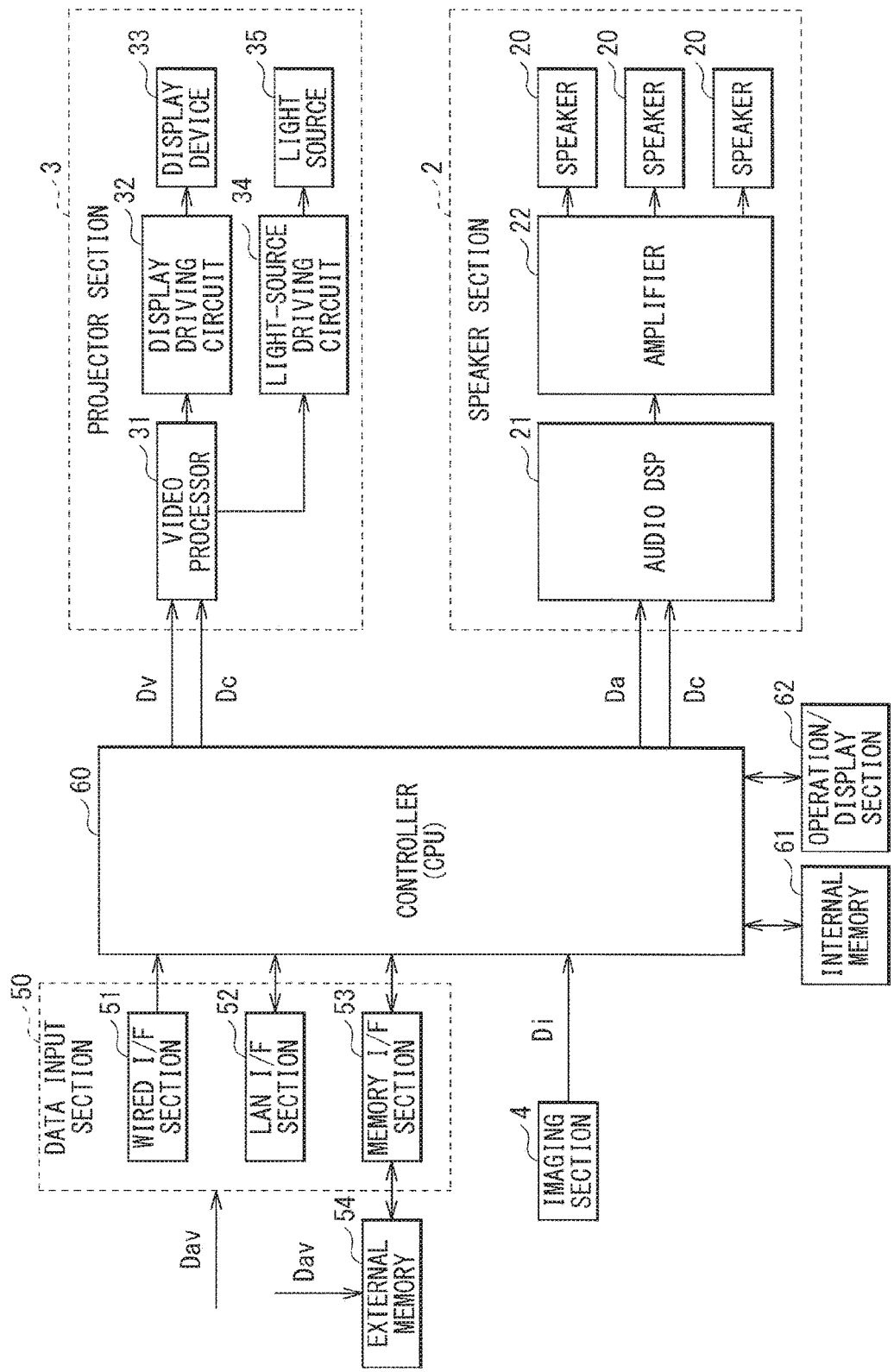
[ FIG. 18 ]

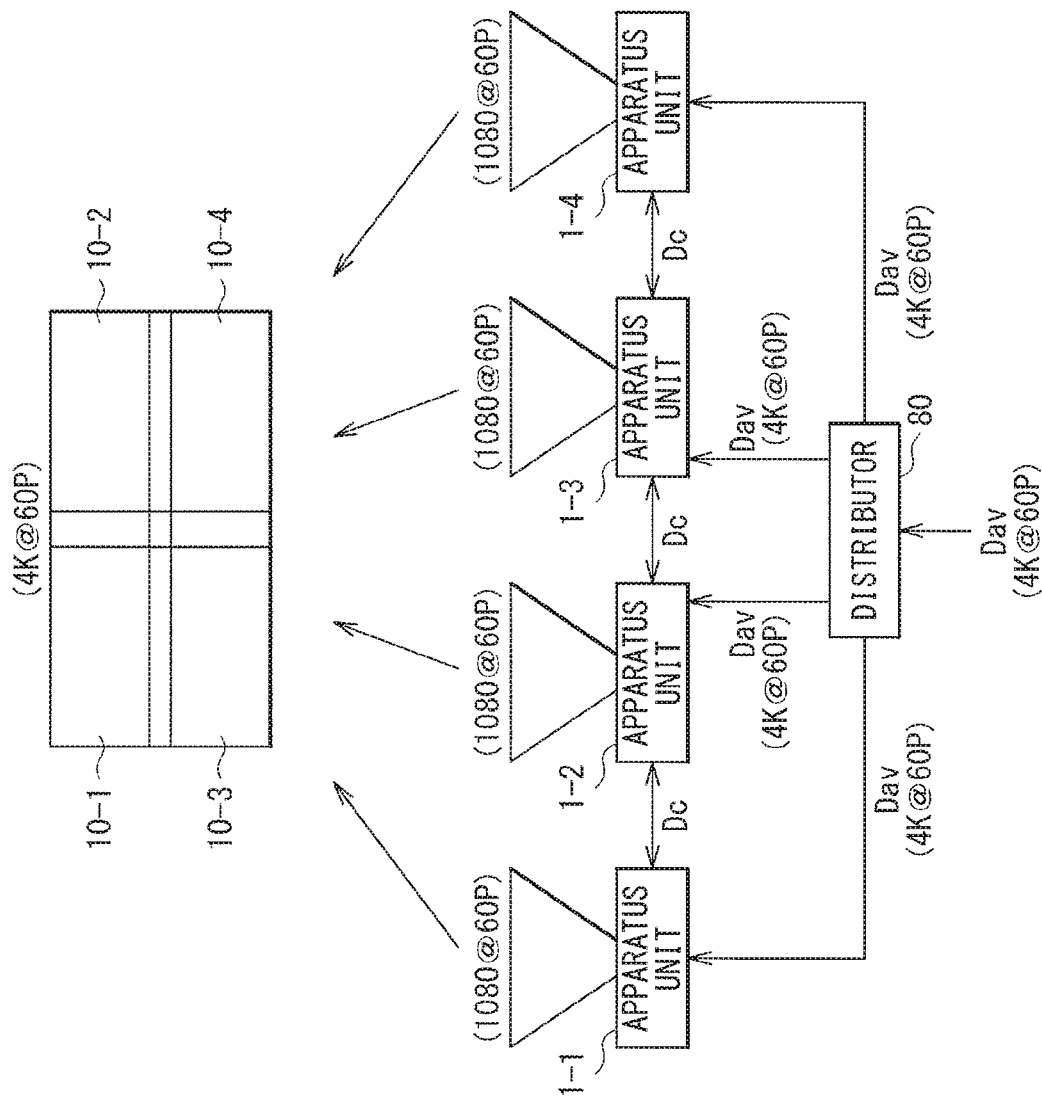
[FIG. 19]

[ FIG. 20 ]
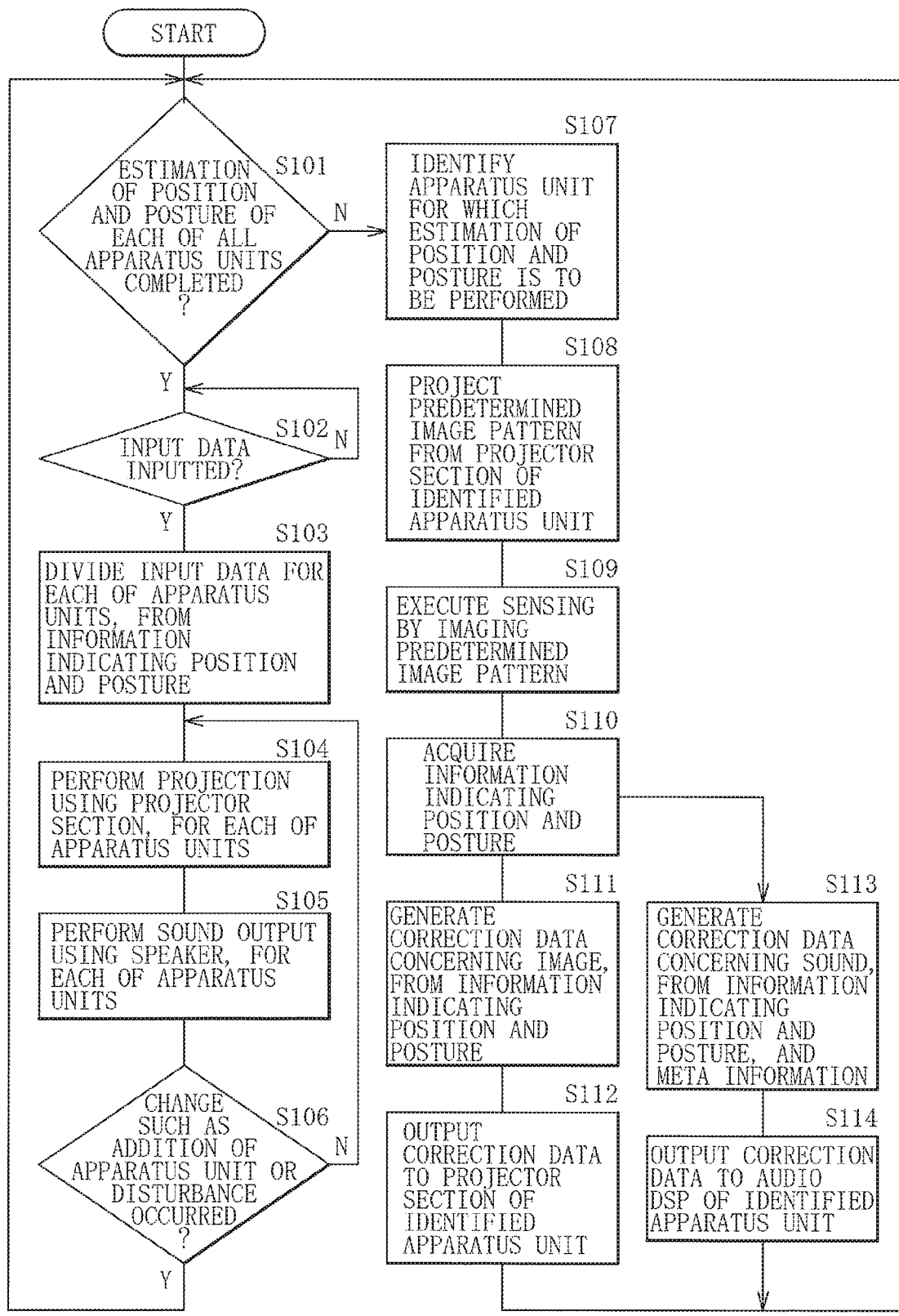

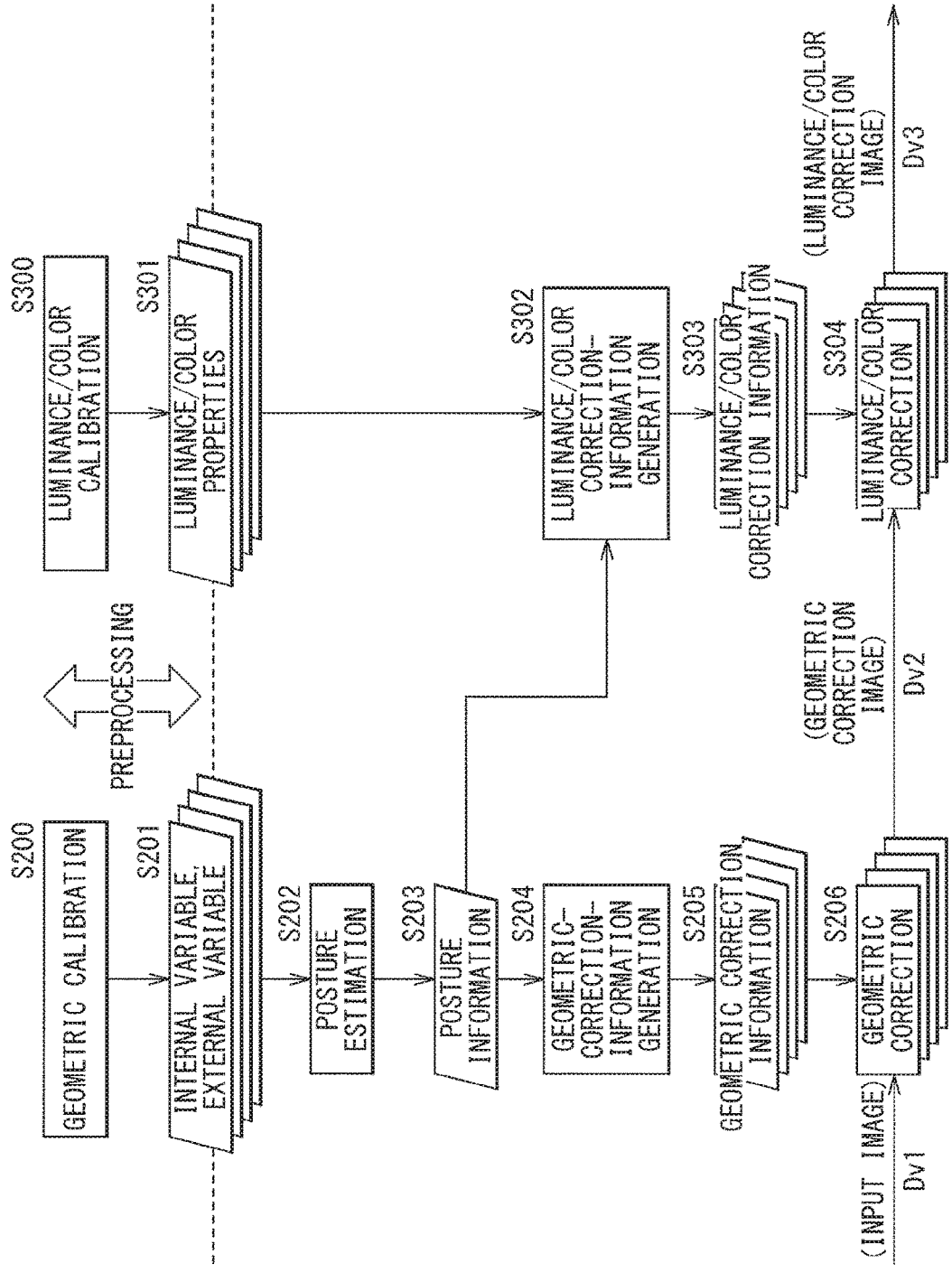

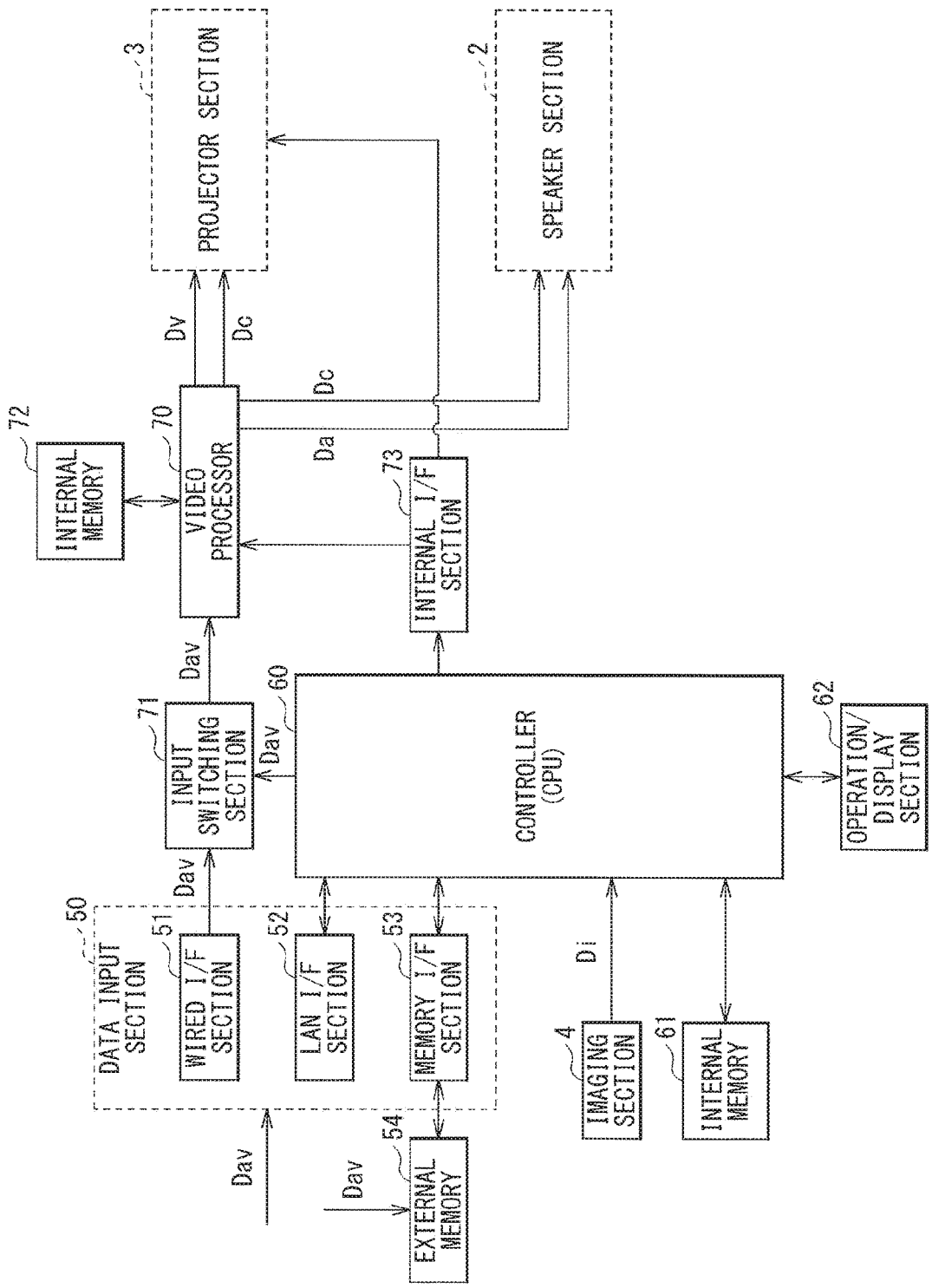
[ FIG. 22 ]

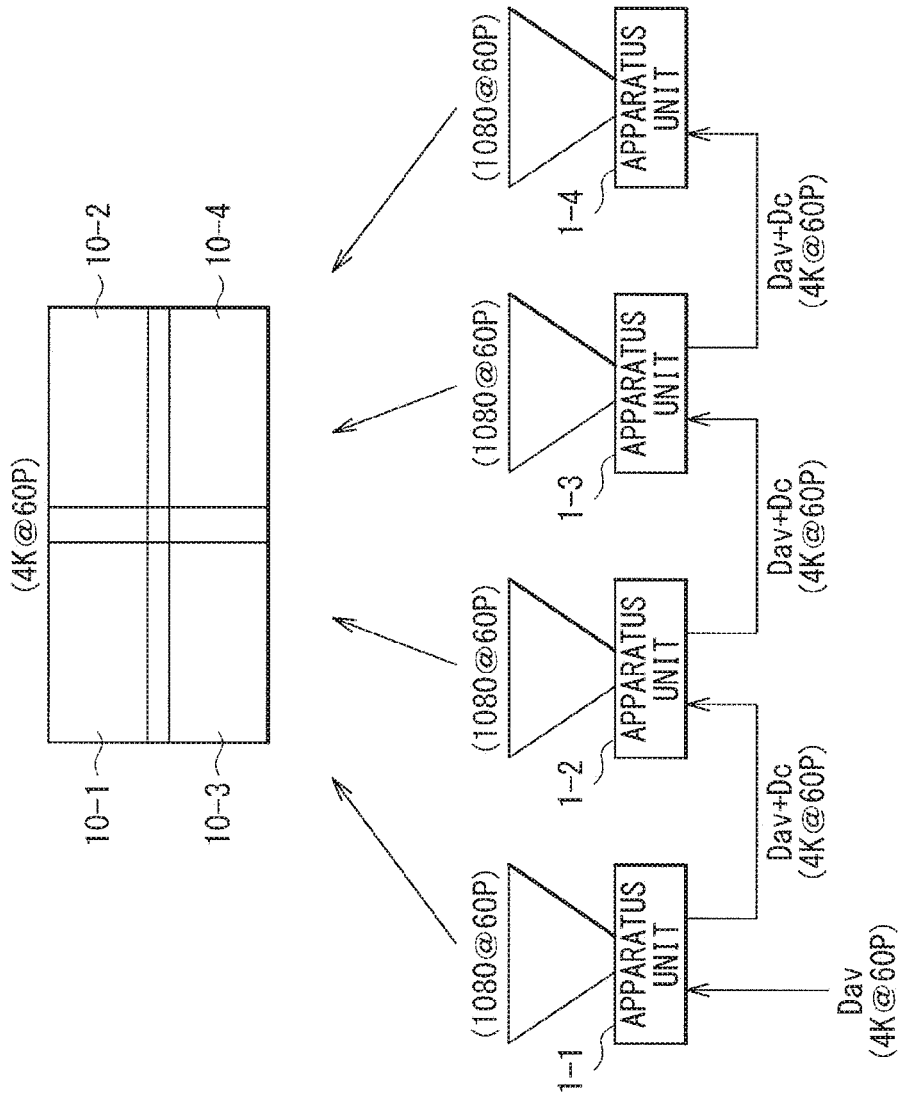
[FIG. 23]

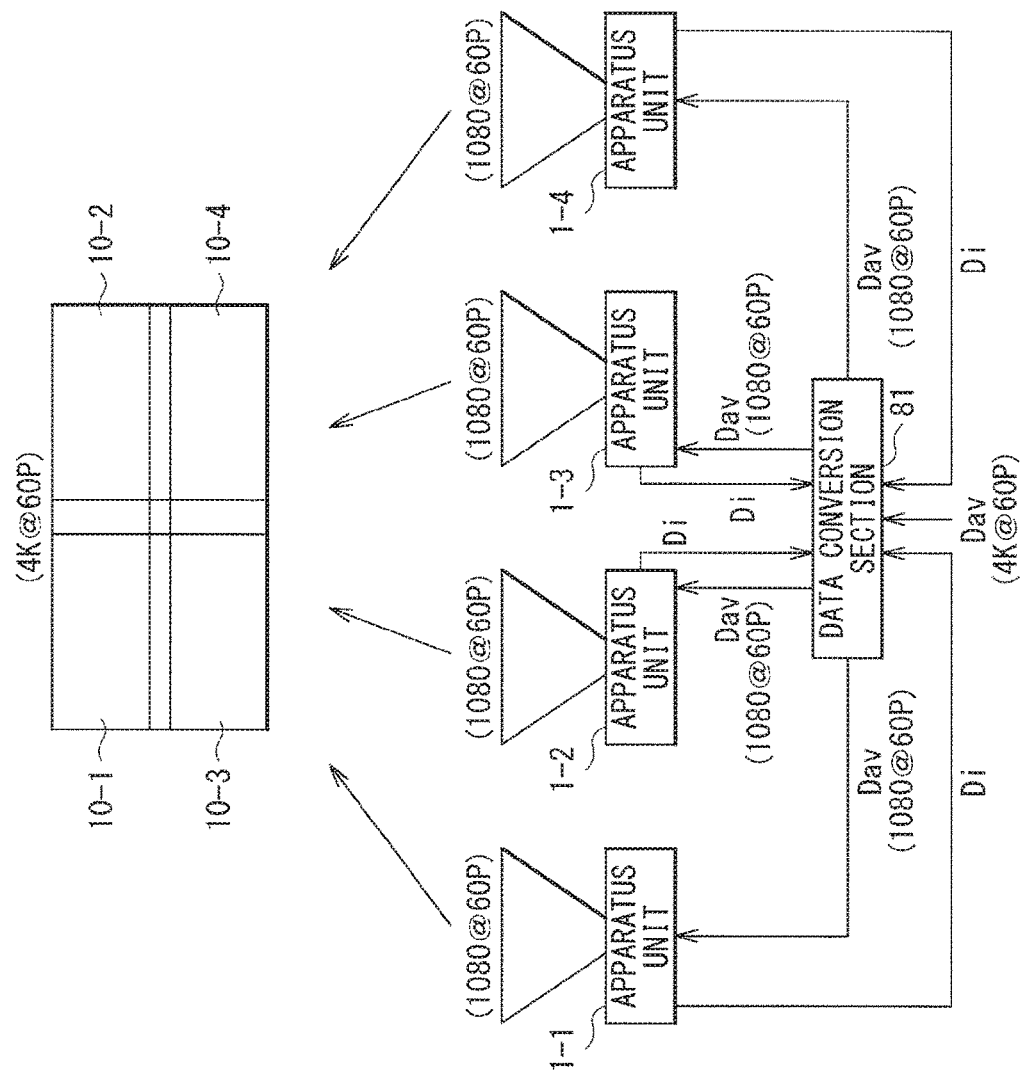
[ FIG. 24 ]

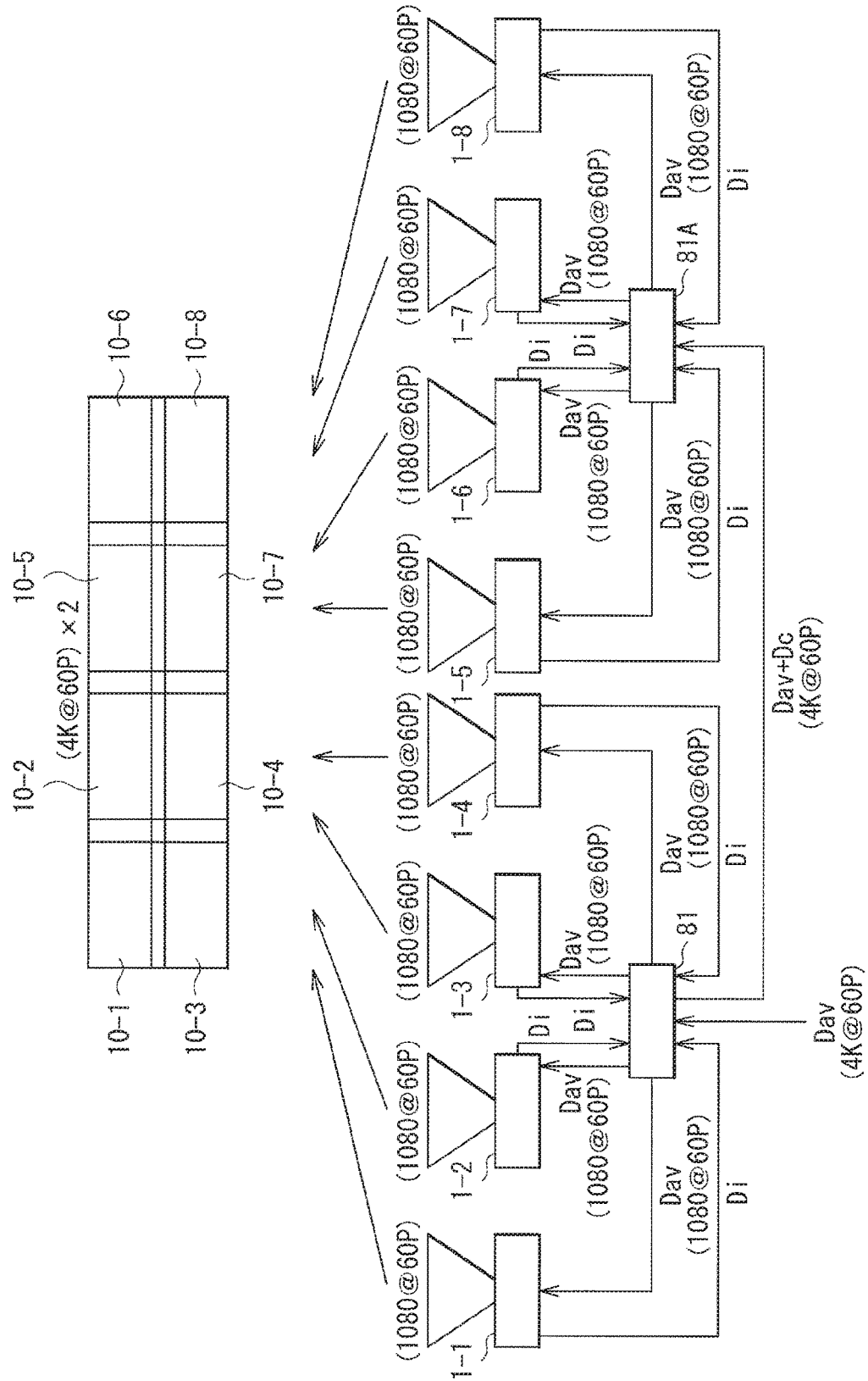

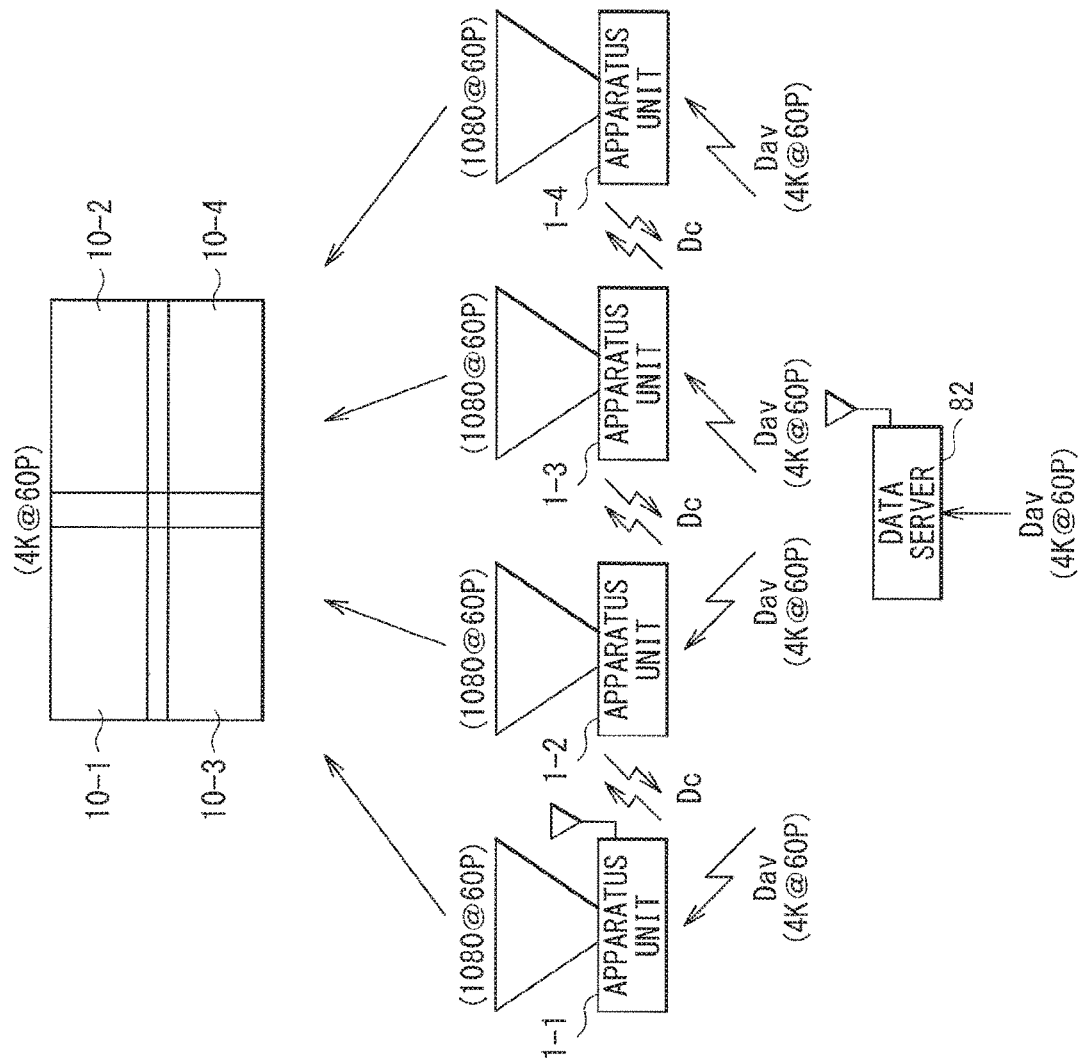

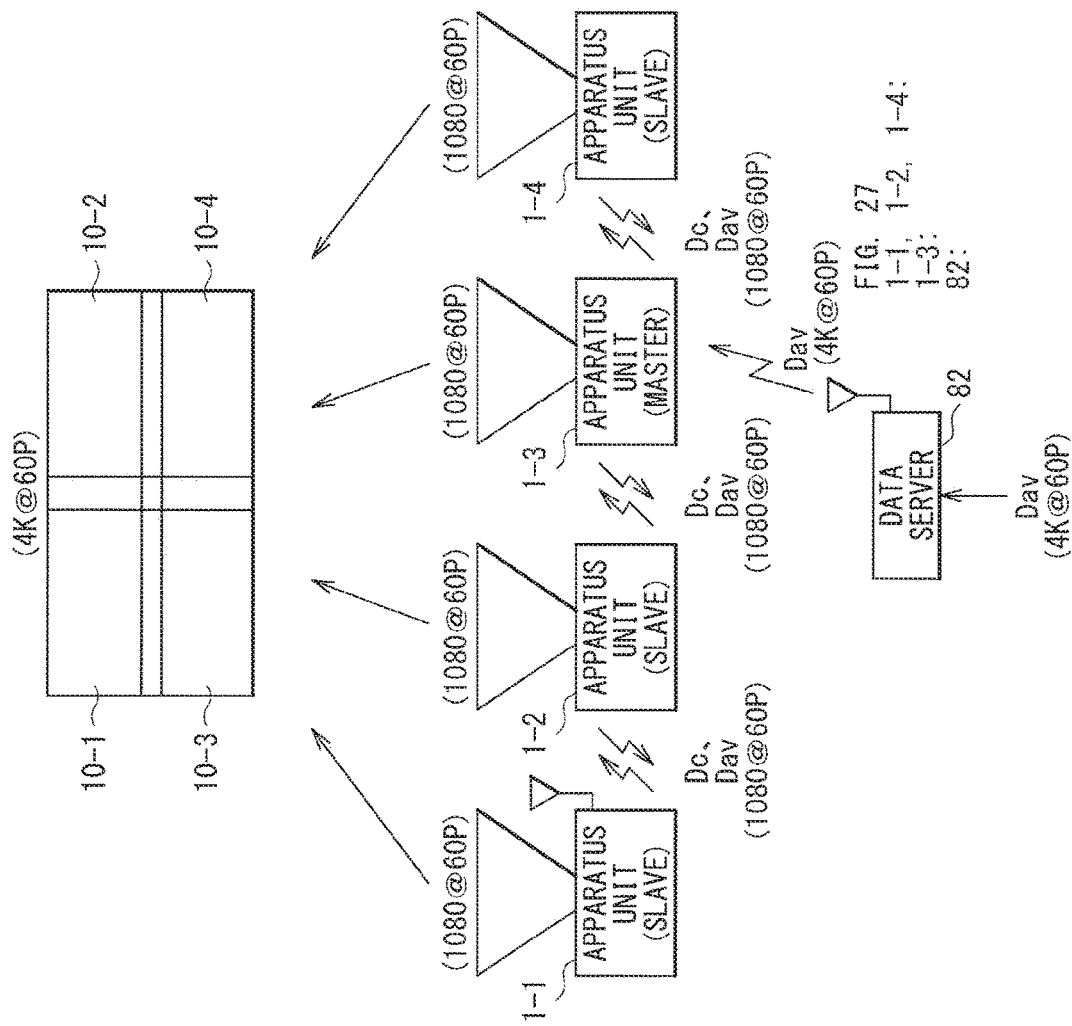
[FIG. 27]

[ FIG. 28 ]
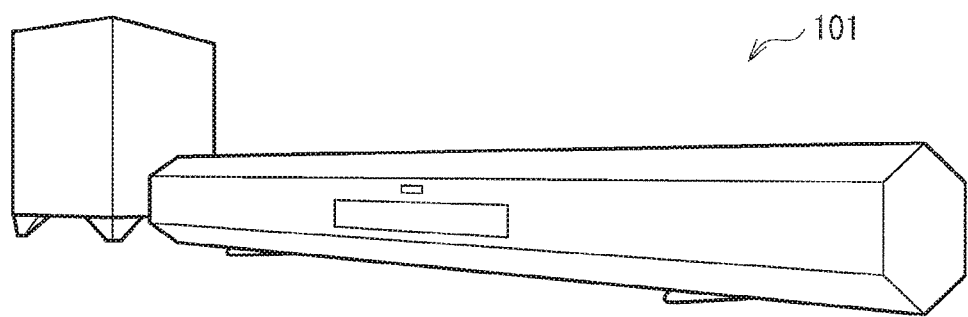
[ FIG. 29 ]
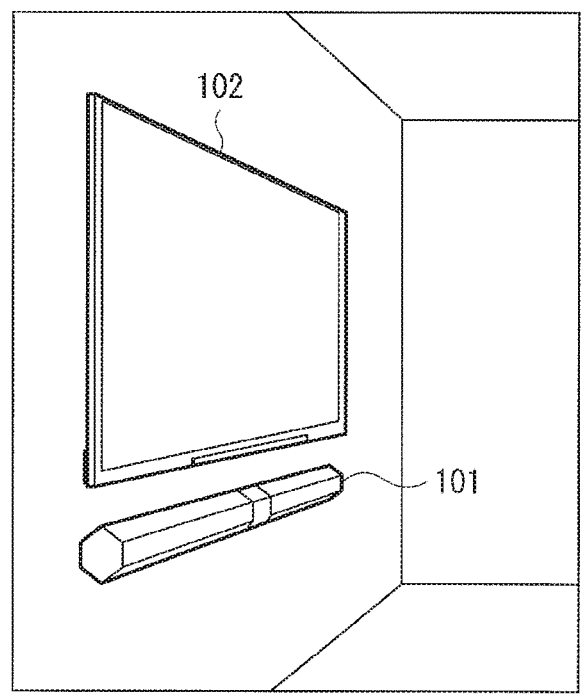

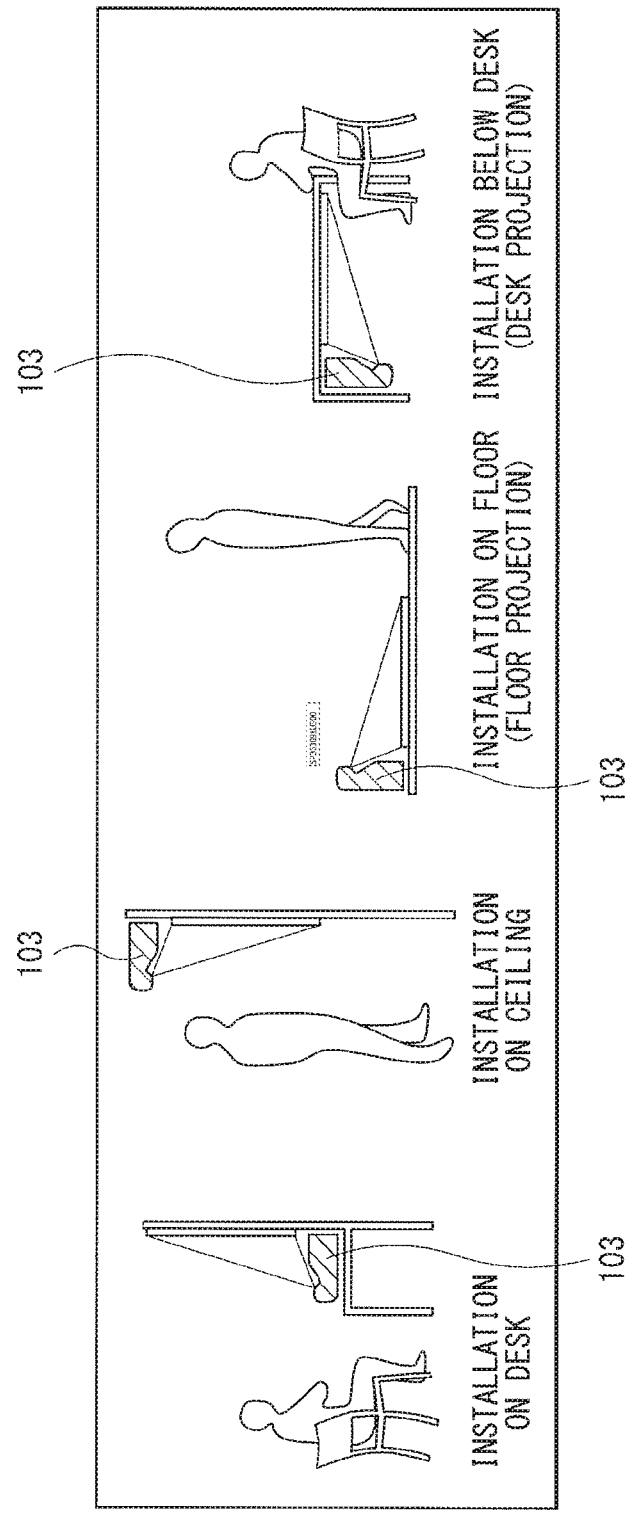
[FIG. 30]

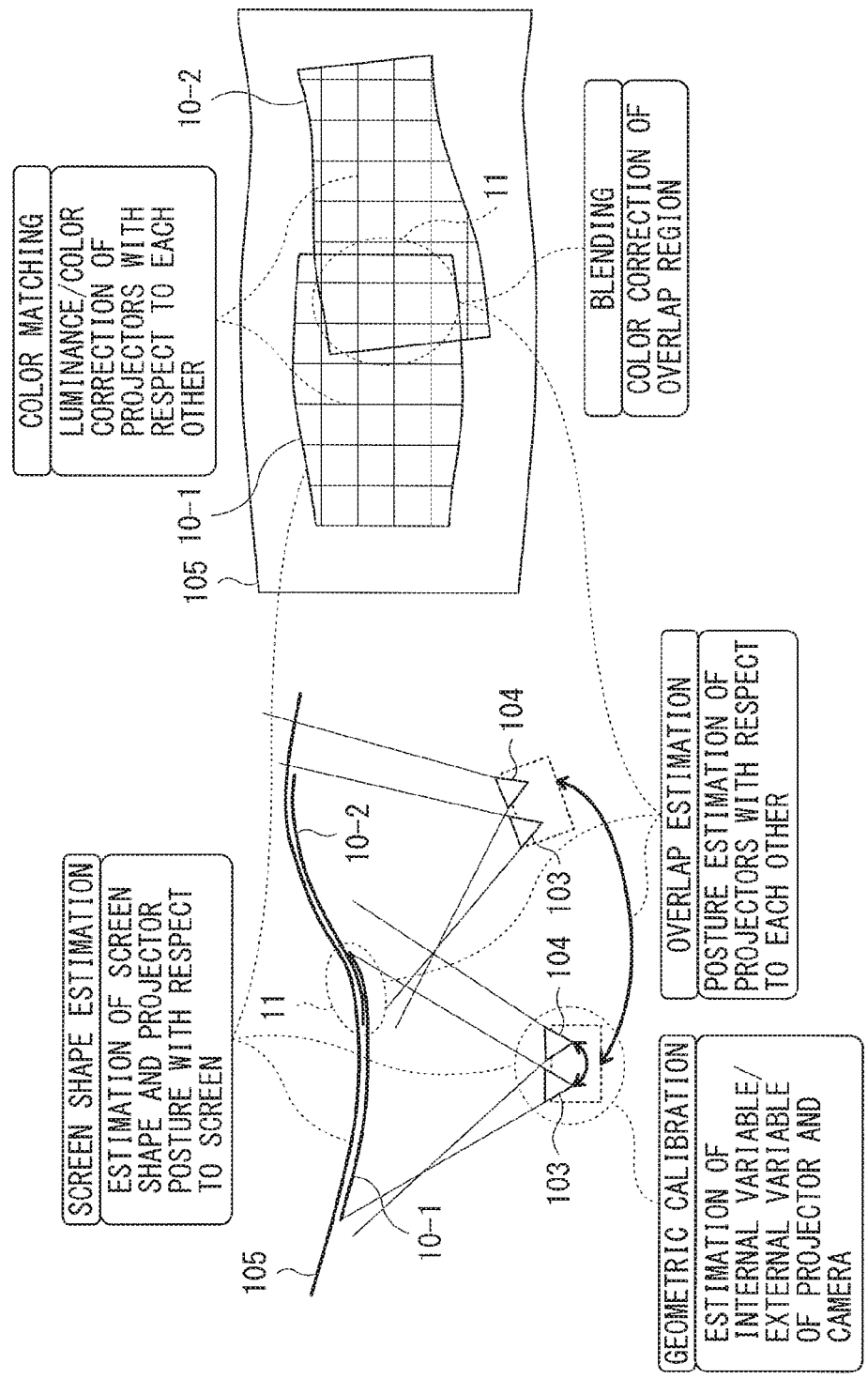
[FIG. 31]

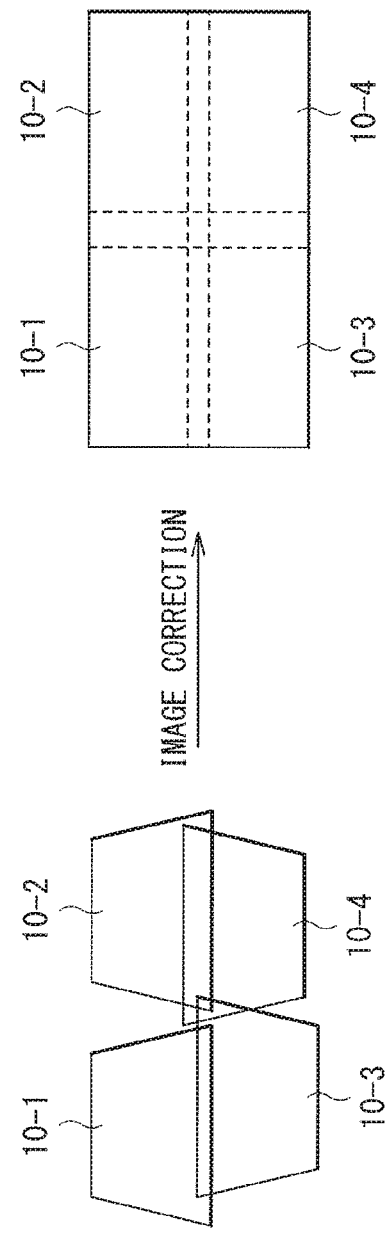

PROJECTION SYSTEM AND APPARATUS UNIT TO IMPLEMENT NEW USE FORM OF PROJECTOR

CROSS REFERENCE TO RELATED APPLICATIONS

This application is a U.S. National Phase of International Patent Application No. PCT/JP2016/069624 filed on Jul. 1, 2016, which claims priority benefit of Japanese Patent Application No. JP 2015-163744 filed in the Japan Patent Office on Aug. 21, 2015. Each of the above-referenced applications is hereby incorporated herein by reference in its entirety.

TECHNICAL FIELD

The disclosure relates to a projection system including a projector, and an apparatus unit.

BACKGROUND ART

As an application for a projector, there is one type of application that performs correction processing for distortion and luminance unevenness of a projection screen. In addition, there is a multi-projection system that combines projection screens provided by a plurality of projectors into one projection screen, by joining the projection screens. In a case of the multi-projection system, there is one type of system that performs, in addition to the above-described correction processing for the distortion and the luminance unevenness of the projection screen, correction processing such as edge blending processing that makes a joint between a plurality of projection screens inconspicuous. As an example of performing the correction processing for the projection screen, there is a technique that captures an image of a projection screen using an imaging unit, creates correction data of the image on the basis of the captured image, and corrects an input image using the correction data. As an example of thus performing the correction processing for the projection screen, there is, for example, a technique described in PTL 1.

CITATION LIST

Patent Literature

PTL 1: Japanese Unexamined Patent Application Publication No. 2011-182077

SUMMARY OF INVENTION

As described above, the technique of combining the plurality of projectors is known, but such a technique related to the combining is a technique mainly related to images.

It is desirable to provide a projection system and an apparatus unit that make it possible to implement a new use form of a projector.

A projection system according to an embodiment of the disclosure includes: an apparatus unit that includes a speaker section, a projector section, and an imaging section, the speaker section including one or more speakers, the imaging section imaging a projection screen provided by the projector section; and a controller that controls a sound output state of the speaker, on a basis of information indicating an installation state of the apparatus unit, the information being estimated on a basis of a captured image obtained by the imaging section.

An apparatus unit according to an embodiment of the disclosure includes: a unit main body including a speaker section, a projector section, and an imaging section, the speaker section including one or more speakers, the imaging section imaging a projection screen provided by the projector section; and a controller that controls a sound output state of the speaker, on a basis of information indicating an installation state of the unit main body, the information being estimated on a basis of a captured image obtained by the imaging section.

In the projection system or the apparatus unit according to the embodiment of the disclosure, the speaker section, the projector section, and the imaging section are included in the one apparatus unit, and the sound output state of the speaker is controlled, on the basis of the information indicating the installation state of the apparatus unit. The information is estimated on the basis of the captured image obtained by the imaging section.

According to the projection system or the apparatus unit according to the embodiment of the disclosure, the speaker section, the projector section, and the imaging section are included in the one apparatus unit, and the sound output state of the speaker is controlled, on the basis of the information indicating the installation state of the apparatus unit. The information is estimated on the basis of the captured image obtained by the imaging section. It is therefore possible to achieve a new use form of the projector.

It is to be noted that effects described here are not necessarily limitative, and may be any of effects described herein.

BRIEF DESCRIPTION OF DRAWINGS

FIG. 1 is an external view of a configuration example of an apparatus unit included in a projection system according to an embodiment of the disclosure.

FIG. 2 is an explanatory diagram schematically illustrating an example of a projection screen provided by a projector section of the apparatus unit illustrated in FIG. 1.

FIG. 3 is an explanatory diagram schematically illustrating an example of a projection screen depending on contents.

FIG. 4 is an explanatory diagram schematically illustrating an example of a projection screen in a case where two apparatus units in total, each illustrated in FIG. 1, are combined in a lateral direction.

FIG. 5 is an explanatory diagram schematically illustrating an example of a projection screen in a case where three apparatus units in total, each illustrated in FIG. 1, are combined in the lateral direction.

FIG. 6 is an explanatory diagram schematically illustrating an example of a projection screen in a case where four apparatus units in total, each illustrated in FIG. 1, are combined in the lateral direction and a vertical direction.

FIG. 7 is an explanatory diagram schematically illustrating an example of a projection screen in a case where two apparatus units in total, each illustrated in FIG. 1, are combined in the vertical direction.

FIG. 8 is an explanatory diagram schematically illustrating an example in which a function and a role of a speaker in the apparatus unit illustrated in FIG. 1 are classified into three.

FIG. 9 is an explanatory diagram schematically illustrating an example of assignment of a function and a role of a speaker in each of apparatus units, in a case where two apparatus units in total, each illustrated in FIG. 1, are combined in the lateral direction.

FIG. 10 is an explanatory diagram schematically illustrating an example of assignment of a function and a role of a speaker in each of apparatus units, in a case where three apparatus units in total, each illustrated in FIG. 1, are combined in the lateral direction.

FIG. 11 is an explanatory diagram schematically illustrating an example of assignment of a function and a role of a speaker in each of apparatus units, in a case where four apparatus units in total, each illustrated in FIG. 1, are combined in the lateral direction and the vertical direction.

FIG. 12 is an external view schematically illustrating an example of a surround system combined with a plurality of speakers.

FIG. 13 is an explanatory diagram schematically illustrating an example in which a function and a role of a speaker in each of apparatus units, each illustrated in FIG. 1, are assigned as those of a speaker that is a part of the surround system illustrated in FIG. 12.

FIG. 14 is an explanatory diagram schematically illustrating an example in which a function and a role of a speaker in each of apparatus units, each illustrated in FIG. 1, are assigned as those of a line array speaker.

FIG. 15 is an explanatory diagram schematically illustrating an example of an effect of a line array speaker.

FIG. 16 is an explanatory diagram schematically illustrating a configuration example in which six apparatus units in total, each illustrated in FIG. 1, are combined in the lateral direction and the vertical direction.

FIG. 17 is an explanatory diagram schematically illustrating an example of a data table corresponding to the configuration example illustrated in FIG. 16.

FIG. 18 is a block diagram illustrating a first configuration example of a control system of the apparatus unit illustrated in FIG. 1.

FIG. 19 is a block diagram illustrating a first example of a coupling form in a case where a plurality of apparatus units, each illustrated in FIG. 1, are combined.

FIG. 20 is a flowchart illustrating an example of a control operation in a case where a plurality of apparatus units, each illustrated in FIG. 1, are combined.

FIG. 21 is a flowchart illustrating an example of a control operation for image correction in the apparatus unit illustrated in FIG. 1.

FIG. 22 is a block diagram illustrating a second configuration example of the control system of the apparatus unit illustrated in FIG. 1.

FIG. 23 is a block diagram illustrating a second example of the coupling form in a case where a plurality of apparatus units, each illustrated in FIG. 1, are combined.

FIG. 24 is a block diagram illustrating a third example of the coupling form in a case where a plurality of apparatus units, each illustrated in FIG. 1, are combined.

FIG. 25 is a block diagram illustrating a fourth example of the coupling form in a case where a plurality of apparatus units, each illustrated in FIG. 1, are combined.

FIG. 26 is a block diagram illustrating a fifth example of the coupling form in a case where a plurality of apparatus units, each illustrated in FIG. 1, are combined.

FIG. 27 is a block diagram illustrating a sixth example of the coupling form in a case where a plurality of apparatus units, each illustrated in FIG. 1, are combined.

FIG. 28 is an external view of an example of a sound bar of a comparative example.

FIG. 29 is an external view of an example of a use form of the sound bar of the comparative example.

FIG. 30 is an explanatory diagram illustrating an example of a use form of a projector of the comparative example.

FIG. 31 is an explanatory diagram illustrating an example of image correction in a case where a plurality of projectors of the comparative example, are combined.

FIG. 32 is an explanatory diagram illustrating an example of each of a pre-image-correction projection screen and a post-image-correction projection screen in a case where the plurality of projectors of the comparative example, are combined.

MODES FOR CARRYING OUT THE INVENTION

Some embodiments of the disclosure are described below in detail with reference to the drawings. It is to be noted that the description is given in the following order.
0. Comparative Example (Configuration Example of Sound Bar and Projector) (FIG. 28 to FIG. 32)
  1. Embodiment of Projection System
    1.1 Configuration
      1.1.1 Basic Configuration Example of Apparatus Unit (FIG. 1 to FIG. 3)
      1.1.2 Screen Configuration Example of Combined Apparatus Units (FIG. 4 to FIG. 7)
      1.1.3 Configuration Example of Speakers of Combined Apparatus Units (FIG. 8 to FIG. 17)
      1.1.4 First Configuration Example of Control System of Apparatus Unit (FIG. 18)
      1.1.5 First Example of Coupling Form of Apparatus Units (FIG. 19)
    1.2 Operation
      1.2.1 Example of Control Operation in Combined Apparatus Units (FIG. 20)
      1.2.2 Creation Example of Correction Data (FIG. 21)
    1.3 Other Configuration Examples
      1.3.1 Second Configuration Example of Control System of Apparatus Unit (FIG. 22)
      1.3.2 Second to Sixth Examples of Coupling Form of Apparatus Units (FIG. 23 to FIG. 27)
    1.4 Effects
  2. Other Embodiments <0. Comparative Example (Configuration Example of Sound Bar and Projector)>

FIG. 28 illustrates an example of a sound bar 101 of a comparative example. FIG. 29 illustrates an example of a use form of the sound bar 101 of the comparative example. To improve acoustic performance in a display unit 102 such as a television, a product referred to as the sound bar 101 equipped with a plurality of speakers may be provided as a unit separate from the display unit 102 and used in combination with the display unit 102, in some cases.

FIG. 30 illustrates an example of a use form of a projector 103 of the comparative example. In recent years, the projector 103 of an ultra-short-focus type has been developed. The projector 103 of this type is installable in proximity to a projection surface such as a screen, and is able to perform projection from close range, unlike a projector of a vertical projection type. Examples of the use forms of the projector 103 of the ultra-short-focus type include installation on a desk, installation on a ceiling, installation on a floor (floor projection), and installation below a desk (desk projection).

FIG. 31 illustrates an example of image correction in a case where a plurality of projectors 103 of the comparative example, are combined. FIG. 32 illustrates an example of each of a pre-image-correction projection screen and a post-image-correction projection screen in a case where the plurality of projectors 103 of the comparative example, are combined.

As illustrated in FIG. 32, there is a technique of combining, for example, four projection screens 10-1, 10-2, 10-3, and 10-4 into one projection screen, by combining the plurality of projectors 103. To achieve such a screen configuration, correction processing for distortion and luminance unevenness of a projection screen in each of the plurality of projectors 103 is performed. In this case, it is possible to apply image-processing techniques usually called geometric calibration, edge blending, and color matching. In the edge blending, an overlap region 11 between the plurality of projection screens is estimated, and color correction, etc. of the overlap region 11 is performed.

For example, a camera 104 for sensing is used to perform the above-described correction processing. It is known in general to be able to estimate a position and a posture of the projector 103 and a surface shape of a screen 105 serving as a projection surface, by imaging a geometric pattern projected from each of the plurality of projectors 103 using the camera 104, and by performing an appropriate calculation. In a projection system described below, it is possible to use such a correction processing technique.

<1. Embodiment of Projection System>
[1.1 Configuration]
(1.1.1 Basic Configuration Example of Apparatus Unit)

FIG. 1 illustrates a configuration example of an apparatus unit 1 that constitutes a projection system according to an embodiment of the disclosure.

The apparatus unit 1 includes a speaker section 2, a projector section 3, and an imaging section 4, which are provided in a housing 5. In addition, a circuit of a control system illustrated in FIG. 18 described later is provided in the housing 5. The sound bar 101 of the comparative example described above has only a function as a simple speaker. However, the apparatus unit 1 according to the present embodiment has a function as a projector, in addition to a function as a speaker.

The projector section 3 and the imaging section 4 are provided, for example, substantially at a center part of a back-face part or a top-face part of the housing 5, as illustrated in FIG. 1. However, the position at which the projector section 3 and the imaging section 4 are provided is not limited to the example illustrated in FIG. 1.

The speaker section 2 includes one or more speakers 20. For example, as illustrated in FIG. 1, the speaker 20 may be provided as each of a plurality of speakers 20 in a lateral direction, on a front-face part (a front) of the housing 5. However, the position and the number of the speakers 20 are not limited to the example illustrated in FIG. 1.

The imaging section 4 is utilized to generate correction data for image correction processing such as geometric calibration processing and luminance/color calibration processing, for a projection screen of the projector section 3.

Further, the imaging section 4 is utilized to determine an installation state including a position, a posture, etc. of the apparatus unit 1. In the present embodiment, a sound output state of the speaker 20 is controlled depending on the position, the posture, etc. of the apparatus unit 1, on the basis of information indicating the installation state of the apparatus unit 1, as described later.

The projector section 3 may have, for example, a configuration of an ultra-short-focus projector that uses a special lens system to have a considerably short projection distance as illustrated in FIG. 30.

FIG. 2 schematically illustrates an example of a projection screen 10 provided by the projector section 3 of the one apparatus unit 1. For example, the projection screen 10 is projected on a projection surface 6 such as a screen. However, the projection surface 6 is not limited to the screen, and may be, for example, a wall surface, a floor, etc.

FIG. 3 schematically illustrates an example of the projection screen 10 provided by the projector section 3 of the apparatus unit 1, depending on contents of an image.

As illustrated in FIG. 3, in general, for example, it is conceivable that, for contents such as news and variety shows, a screen size may be small, but a demand for visually bright image display may be high. Meanwhile, in general, for example, it is conceivable that, for contents such as movies and dramas, a screen may be dark, but a demand for display in a large-size screen may be high. It is desirable to provide the projector section 3 configured to be able to meet such demands. This makes it possible to achieve a use case that is not feasible with an ordinary television of a fixed size. It is possible to achieve this use case by, for example, configuring the projector section 3 using the projector 103 of the ultra-short-focus type illustrated in FIG. 30, and by mounting a zoom lens as a projection optical system. Further, it is also possible to achieve this use case by physically moving the entire apparatus unit 1 back and forth, relative to a projection surface. Furthermore, for example, a projection magnification may be changed by mounting an electric zoom lens, etc. on the projection optical system in the projector section 3, and by distinguishing between pieces of categorical information of image contents such as movies and news, on the basis of program information such as EPG.

For reference, a model mathematical expression that proves such a use case is described below. This expresses a relationship of a screen area and a luminance on a screen, with respect to the same light quantity. It is apparent from this expression that, basically, in projectors having the same light quantity, the larger the screen size is, the darker the screen luminance is, and the smaller the screen size is, the greater the screen luminance is.

$$\text{Screen Luminance} = \frac{\text{Projector Light Quantity } (ANSIlm)}{\text{Screen Area } (m^2) \times \text{Circumference Ratio}} (cd/m^2)$$

Practically, it is possible to express the relationship, using the following expression in which a screen gain factor Ksg and an aspect ratio coefficient Kasp are added.

$$\text{Screen Luminance} = \frac{\text{Projector Light Quantity } (ANSIlm) \times Ksg \times Kasp}{\text{Screen Area } (m^2) \times \text{Circumference Ratio}} (cd/m^2) \quad (1.1.2$$

Screen Configuration Example of Combined Apparatus Units)

It is possible to configure a projection system by combining a plurality of apparatus units 1. It is possible to form one composite screen by joining the projection screens 10 provided by the respective projector sections 3 in the plurality of apparatus units 1. A specific example of the screen configuration example in which the plurality of apparatus units 1 are combined is described below.

FIG. 4 schematically illustrates an example of a projection screen in a case where the two apparatus units 1 in total are combined in the lateral direction. In this display example, the projection screens 10-1 and 10-2 provided, respectively, by the two apparatus units 1-1 and 1-2 are combined in the lateral direction, to display a horizontally long projection screen. The display example in FIG. 4 is suitable for, for example, display of contents such as a movie of a panoramic size and a movie of a cinema scope size.

FIG. 5 schematically illustrates an example of a projection screen in a case where the three apparatus units 1 in total are combined in the lateral direction. In this display example, the projection screens 10-1, 10-2, and 10-3 provided, respectively, by the three apparatus units 1-1, 1-2, and 1-3 are combined in the lateral direction, to display a horizontally long projection screen. The display example in FIG. 5 is suitable for, for example, display of contents of a panoramic size.

FIG. 6 schematically illustrates an example of a projection screen in a case where the four apparatus units 1 in total are combined in the lateral direction and a vertical direction. In this display example, the projection screens 10-1, 10-2, 10-3, and 10-4 provided, respectively, by the four apparatus units 1-1, 1-2, 1-3, and 1-4 are combined in the lateral direction and the vertical direction, to display a projection screen having a display size increased in the lateral direction and the vertical direction. The display example in FIG. 6 is suitable for, for example, display of contents having a high resolution. For example, assume that the apparatus units 1-1, 1-2, 1-3, and 1-4 each project an image having a 2K resolution of pixels (1920×1080). In this case, as a whole, it is possible to provide a 4K resolution of pixels (3840×2160), and it is possible to provide a quadruple resolution.

FIG. 7 schematically illustrates an example of a projection screen in a case where the two apparatus units 1 in total are combined in the vertical direction. In this display example, the projection screens 10-1 and 10-2 provided, respectively, by the two apparatus units 1-1 and 1-2 arranged in the vertical direction are projected substantially at the same position. In the display example in FIG. 7, the screen size remains unchanged from the case of the one apparatus unit, but it is possible to substantially double the luminance. This makes it possible to achieve image display called stacking, etc.

To achieve such a screen configuration, it is possible to apply image-processing techniques generally called geometric correction and edge blending, as image signal processing in the projector section 3 of each of the plurality of apparatus units 1. In addition, it is possible to use the techniques illustrated in FIG. 31 and FIG. 32. It is known in general to be able to estimate the position and the posture of the projector 3 and the surface shape of the projection surface, by imaging a geometric pattern projected from the projector 3 of each of the plurality of apparatus units 1 using the camera 104 as a camera for sensing, and by performing an appropriate calculation on the basis of corresponding points.

Using this sensing result, it is possible to obtain correction data of geometric correction, edge blending, and luminance/color correction for an image signal to be outputted. It is therefore possible to display one screen on the projection screens, even when the apparatus units 1 are in various installation states as illustrated in FIG. 4 to FIG. 7.

(1.1.3 Configuration Example of Speakers of Combined Apparatus Units)

As described above, in the case where the screen is configured by combining the plurality of apparatus units 1, the installation state including the position, the posture, etc. of the apparatus unit 1 variously changes. Accordingly, in the present embodiment, the sound output state of the speaker 20 is changed depending on the position, the posture, etc. of the apparatus unit 1, on the basis of the information indicating the installation state of the apparatus unit 1.

FIG. 8 schematically illustrates an example in which a function and a role of the speaker 20 in the apparatus unit 1 are classified into three. In a case where the apparatus unit 1 includes the three or more speakers 20, considering only the one apparatus unit 1, it is possible to classify, roughly, the one or more speakers 20 located at center as a center speaker group 20C, the one or more speakers 20 located at left as a left speaker group 20L, and the one or more speakers 20 located at right as a right speaker group 20R.

In the present embodiment, in a case where the plurality of apparatus units 1 are combined, a configuration of a speaker group in each of the apparatus units 1 is changed to a state different from the configuration in the case where only the one apparatus unit 1 is considered as illustrated in FIG. 8.

FIG. 9 schematically illustrates an example of assignment of a function and a role of the speaker 20 in each of the apparatus units 1-1 and 1-2, in a case where the two apparatus units 1 in total are combined in the lateral direction. It is to be noted that FIG. 9 corresponds to the screen configuration example in FIG. 4.

In the example in FIG. 9, the one or more speakers 20 located at center as a whole in the two apparatus units 1-1 and 1-2 form the center speaker group 20C, with respect to the configuration example in FIG. 8. Further, the one or more speakers 20 located at left as a whole in the two apparatus units 1-1 and 1-2 form the left speaker group 20L. Furthermore, the one or more speakers 20 located at right as a whole in the two apparatus units 1-1 and 1-2 form the right speaker group 20R. As compared with the configuration example in FIG. 8, for example, the right speaker group 20R in the case where only the apparatus unit 1-1 is considered is changed to the center speaker group 20C. In addition, for example, the left speaker group 20L and the center speaker group 20C in the case where only the apparatus unit 1-1 is considered are changed to the left speaker group 20L as a whole.

One of effects of such a speaker configuration includes an increase in sound pressure of the speaker 20. In general, it is known that the following effect be obtained by combining the plurality of speakers 20.

It is considered that, when the number of the speakers 20 is increased to two, sound pressure doubles, and distortion halves. In other words, because energy doubles with a sound pressure of 3 dB, an output up to 103 dB is obtainable when it is possible to use the two speakers 20 that are each able to output a maximum sound pressure of 100 dB. From a different standpoint, this increase in the sound pressure by 3 dB is equivalent to bringing the speaker 20 in itself close to a location one meter away from a viewer.

Accordingly, as for the configuration example in FIG. 9, because of the doubled number of the speaker units at each of the left, the right, and the center, the sound pressure also doubles by 3 dB.

FIG. 10 schematically illustrates an example of assignment of the function and the role of the speaker 20 in each of the apparatus units 1-1, 1-2, and 1-3, in a case where the three apparatus units 1 in total are combined in the lateral direction. It is to be noted that FIG. 10 corresponds to the screen configuration example in FIG. 5.

In the example in FIG. 10, all the speakers 20 of the apparatus unit 1-2 located at center as a whole form the center speaker group 20C. Further, all the speakers 20 of the apparatus unit 1-1 located at left as a whole form the left speaker group 20L. Furthermore, all the speakers 20 of the apparatus unit 1-3 located at right as a whole form the right speaker group 20R.

FIG. 11 schematically illustrates an example of assignment of the function and the role of the speaker 20 in each of the apparatus units 1-1, 1-2, 1-3, and 1-4, in a case where the four apparatus units 1 in total are combined in the lateral direction and the vertical direction. It is to be noted that FIG. 11 corresponds to the screen configuration example in FIG. 6.

In the example in FIG. 11, the one or more speakers 20 located at center as a whole in the four apparatus units 1-1, 1-2, 1-3, and 1-4 form the center speaker group 20C, with respect to the configuration example in FIG. 8. Further, the one or more speakers 20 located at left as a whole in the four apparatus units 1-1, 1-2, 1-3, and 1-4 form the left speaker group 20L. Furthermore, the one or more speakers 20 located at right as a whole in the four apparatus units 1-1, 1-2, 1-3, and 1-4 form the right speaker group 20R. As compared with the configuration example in FIG. 8, for example, the right speaker group 20R in the case where only the apparatus unit 1-1 is considered is changed to the center speaker group 20C. In addition, for example, the left speaker group 20L and the center speaker group 20C in the case where only the apparatus unit 1-1 is considered are changed to the left speaker group 20L as a whole.

In the configuration example in FIG. 11, speaker placement of division in the vertical direction is provided. Therefore, when the speakers 20 of the four apparatus units 1-1, 1-2, 1-3, and 1-4 are combined to be located at right, left, and center, simply, a 9-dB increase is attained, and an 8-fold sound pressure is obtained. It is possible to obtain a large screen and a volume appropriate for a high-definition image provided by the four projector sections 3.

FIG. 12 is an external view schematically illustrating an example of a surround system in which a plurality of speakers are combined. The surround system illustrated in FIG. 12 is called Dolby Atoms.

FIG. 13 schematically illustrates an example in which the function and the role of the speaker 20 in each of the apparatus units 1-1, 1-2, 1-3, and 1-4 are assigned as those of some of the speakers of the surround system illustrated in FIG. 12, in a case where the four apparatus units 1 in total are combined in the lateral direction and the vertical direction. In a configuration in FIG. 13, there is provided a system assuming multi-speaker placement in the surround system called Dolby Atoms illustrated in FIG. 12. In the example in FIG. 13, the one or more speakers 20 located at center as a whole in the four apparatus units 1-1, 1-2, 1-3, and 1-4 form the center speaker group 20C, with respect to the configuration example in FIG. 8.

Further, the one or more speakers 20 located on upper left side as a whole in the four apparatus units 1-1, 1-2, 1-3, and 1-4 form a Presence L speaker group 20PL. Furthermore, the one or more speakers 20 located on upper right side as a whole in the four apparatus units 1-1, 1-2, 1-3, and 1-4 form a Presence R speaker group 20PR. In addition, the one or more speakers 20 located on lower left side as a whole in the four apparatus units 1-1, 1-2, 1-3, and 1-4 form a Main L speaker group 20ML. Moreover, the one or more speakers 20 located on lower right side as a whole in the four apparatus units 1-1, 1-2, 1-3, and 1-4 form a Main R speaker group 20MR.

FIG. 14 schematically illustrates an example in which the function and the role of the speaker 20 in each of the apparatus units 1-1, 1-2, 1-3, and 1-4 are assigned as those of line-array speaker groups 20A and 20B, in a case where the four apparatus units 1 in total are combined in the lateral direction and the vertical direction.

In the example in FIG. 14, the speakers 20 of the two apparatus units 1-1 and 1-2 on upper side as a whole form the line-array speaker group 20A. Further, the speakers 20 of the two apparatus units 1-3 and 1-4 on lower side as a whole form the line-array speaker group 20B.

FIG. 15 schematically illustrates an example of an effect in a case where the line-array speaker groups 20A and 20B are configured as illustrated in FIG. 14. In the case of the configuration of the line-array speaker groups 20A and 20B, an effect is obtained by a further extended point of a sound source. Examples of the effect include three effects that are "less attenuation of sound", "a small difference in sound level between inside and outside of an area", and "less occurrence of howling".

FIG. 16 schematically illustrates a configuration example in which the six apparatus units 1 in total are combined in the lateral direction and the vertical direction. FIG. 17 schematically illustrates an example of a data table corresponding to the configuration example illustrated in FIG. 16. Here, the six apparatus units 1 are referred to as Bar-1, Bar-2, Bar-3, Bar-4, Bar-5, and Bar-6.

It is possible to use, for example, a parameter group illustrated in FIG. 17, as data indicating information indicating the installation state of each of the apparatus units, as illustrated in FIG. 16. The parameter group illustrated in FIG. 17 includes a parameter representing a specific numerical value into which the installation state of each of the apparatus units illustrated in FIG. 16 is converted. A parameter indicating a relative positional relationship between the apparatus units, the number of the mounted speakers 20, and a rotation state of each of the apparatus units are each prepared as the parameter. This makes it possible to express whether placement of each of the apparatus units is in a transposition state.

(Case of Only One Apparatus Unit 1)

The configuration examples of the speakers 20 of the combined plurality of apparatus units 1 are described above. However, even when the only one apparatus unit 1 is provided, it is possible to change the sound output states of the plurality of speakers 20 within the apparatus unit 1, depending on information indicating the position and the posture of the apparatus unit 1.

For example, a center of a projection surface is estimated, and a viewer is assumed to be present at the center. This makes it possible to estimate an angle between the viewer and an acoustic axis of the speaker 20. It is therefore possible to perform directional characteristics compensation such as wide-area compensation. Further, in a case where the speaker 20 of the apparatus unit 1 is a woofer, it is possible to find relative positions between the apparatus unit 1 and a wall surface, etc. Therefore, it is possible to perform delay compensation (time alignment compensation) of a sound propagation time.

(1.1.4 First Configuration Example of Control System of Apparatus Unit)

FIG. 18 illustrates a first configuration example of the control system of the one apparatus unit 1.

The apparatus unit 1 includes the speaker section 2, the projector section 3, the imaging section 4, a data input section 50, and a controller 60. The apparatus unit 1 further includes an internal memory 61 and an operation/display section 62 that are coupled to the controller 60.

The speaker section 2 includes the speakers 20, an audio DSP (Digital Signal Processor) 21, and an amplifier 22.

The projector section 3 includes a video processor 31, a display driving circuit 32, a display device 33, a light-source driving circuit 34, and a light source 35.

The display device 33 is controlled to be driven by the display driving circuit 32. The display device 33 is configured by, for example, a device such as a liquid crystal display device and a device using MEMS (Micro Electro Mechanical Systems). The display device 33 is illuminated by illumination light from the light source 35, to display an image.

The light source 35 is controlled to be driven by the light-source driving circuit 34. The light source 35 is configured by, for example, a light source such as a laser light source.

AV data that includes image data Dv and sound data Da are inputted, as input data Day, to the data input section 50. Further, the input data Day may be inputted through an external memory 54. The data input section 50 has a wired I/F (interface) section 51, a LAN I/F section 52, and a memory I/F section 53.

The wired I/F section 51 is, for example, an I/F compliant with HDMI (High Definition Multimedia Interface) (registered trademark). The LAN (Local Area Network) I/F section 52 is a wired or wireless network I/F. In addition to the LAN, a WAN (Wide Area Network) I/F section may be provided. In the present embodiment, a form for network coupling is not limited in particular. The memory I/F section 53 is an I/F that couples the external memory 54. The external memory 54 is detachably attachable to the memory I/F section 53, and is, for example, a semiconductor memory.

The controller 60 is configured by, for example, a CPU (Central Processing Unit), etc. The input data Day are inputted to the controller 60 through the data input section 50. In addition, imaging data Di generated by the imaging section 4 are inputted to the controller 60.

The controller 60 generates correction data Dc for correction of a projection screen provided by the projector section 3, on the basis of a captured image obtained by the imaging section 4. For example, the controller 60 generates the correction data Dc for the image correction processing such as the geometric calibration processing and the luminance/color calibration processing, on the basis of the imaging data Di generated by the imaging section 4. Further, the controller 60 performs processing such as screen division processing for the image data Dv, as necessary. The controller 60 generates the correction data Dc concerning an image, and outputs the generated correction data Dc together with the image data Dv, to the projector section 3. It is to be noted that the controller 60 and the projector section 3 are coupled by, for example, an I2C (Inter Integrated Circuit) interface.

Further, the controller 60 controls the sound output state of the speaker 20, on the basis of the information indicating the installation state of the apparatus unit 1. The information is estimated on the basis of the captured image obtained by the imaging section 4. The controller 60 generates the correction data Dc concerning a sound, and outputs the generated correction data Dc together with the sound data Da, to the speaker section 2. It is to be noted that the controller 60 and the speaker section 2 are coupled by, for example, an I2S (Inter IC Sound) interface.

The controller 60 estimates information indicating at least the position and the posture of the apparatus unit 1, as the information indicating the installation state. In a case where the plurality of apparatus units 1 are present, the controller 60 estimates information indicating at least relative positions among the plurality of apparatus units, as the information indicating the installation state.

The controller 60 may control two or more of the speakers 20 provided in adjacent two or more of the apparatus units 1, to serve as one speaker group having the same sound output state, as in the configuration examples illustrated in FIG. 9, FIG. 11, FIG. 13, and FIG. 14, for example.

Further, the controller 60 may control the speaker 20 of each of the plurality of apparatus units 1, to belong to any of a plurality of speaker groups having sound output states different from each other, as in the configuration examples illustrated in FIG. 9 to FIG. 11, FIG. 13, and FIG. 14, for example. In this case, as in the configuration examples illustrated in FIG. 9 to FIG. 11, for example, the plurality of speaker groups may include the center speaker group 20C, the left speaker group 20L, and the right speaker group 20R.

Furthermore, the controller 60 may control all the speakers 20 of adjacent two or more of the apparatus units 1 in the lateral direction, to serve as one line-array speaker group having the same sound output state, as in the configuration example illustrated in FIG. 14, for example.

(1.1.5 First Example of Coupling Form of Apparatus Units)

FIG. 19 illustrates a first example of a coupling form in a case where the plurality of apparatus units 1 are combined. FIG. 19 illustrates an example in which the projection screens 10-1, 10-2, 10-3, and 10-4 provided, respectively, by the four apparatus units 1-1, 1-2, 1-3, and 1-4 are combined, to display, for example, one projection screen of 4K/60P (4K@60P).

In this coupling form, a distributor 80 coupled to each of the apparatus units 1-1, 1-2, 1-3, and 1-4 is provided. For example, the input data Day of 4K/60P (4K@60P) are inputted to each of the apparatus units 1-1, 1-2, 1-3, and 1-4, through the distributor 80. The apparatus units 1-1, 1-2, 1-3, and 1-4 are coupled to one another by, for example, the wired I/F section 51 or the LAN I/F section 52. In addition, each of the apparatus units 1-1, 1-2, 1-3, and 1-4 and the distributor 80 are coupled to each other by, for example, the wired I/F section 51 or the LAN I/F section 52.

The image correction processing such as the geometric calibration processing and the luminance/color calibration processing, and the screen division processing, etc. are performed in each of the apparatus units 1-1, 1-2, 1-3, and 1-4. The apparatus units 1-1, 1-2, 1-3, and 1-4 share the correction data Dc to perform the image correction processing, etc.

The apparatus units 1-1, 1-2, 1-3, and 1-4 each project, for example, an image of 1080/60P (1080@60P) obtained by dividing an image of 4K/60P (4K@60P).

[1.2 Operation]

(1.2.1 Example of Control Operation in Combined Apparatus Units)

FIG. 20 illustrates an example of control operation in a case where the plurality of apparatus units 1 are combined.

It is to be noted that the control operation is described below as an operation performed by the one or more controllers 60 in the plurality of apparatus units 1, using the coupling form in FIG. 19 as an example. However, in a case of a coupling form in FIG. 24 described later, the control operation may be an operation performed by a data conversion section 81. Further, in a case of a coupling form in FIG. 27 described later, the control operation may be an operation performed by the controller 60 in the apparatus unit 1-3 that serves as a master.

The controller 60 determines whether estimation of a position and a posture of each of all the apparatus units 1 is completed (step S101). In a case where the estimation of the position and the posture of all the apparatus units 1 is completed (step S101; Y), the controller 60 determines whether input data are inputted (step S102). The controller 60 waits for processing until the input data are inputted (step S102; N). In a case where the input data are inputted (step S102; Y), the controller 60 divides the input data for each of the apparatus units 1, from information indicating the position and the posture (step S103). Next, the controller 60 performs projection using the projector section 3 for each of the apparatus units 1 (step S104). Further, the controller 60 performs sound output using the speaker 20 for each of the apparatus units 1 (step S105). Next, the controller 60 determines whether there is a change in the installation state of the apparatus unit 1, such as addition of the apparatus unit 1 or disturbance (step S106). In a case where there is no change in the installation state (step S106; N), the controller 60 returns to the processing in step S104. In a case where there is a change in the installation state (step S106; Y), the operation returns to the processing in step S101.

On the other hand, in a case where the estimation of the position and the posture of each of all the apparatus units 1 is not completed in step S101 (step S101; N), the controller 60 identifies the apparatus unit 1 for which estimation of a position and a posture is to be performed (step S107). Next, the controller 60 projects a predetermined image pattern to perform the estimation of the position and the posture, from the projector section 3 of the identified apparatus unit 1 (step S108). Next, the controller 60 executes sensing, by imaging the predetermined image pattern, using the imaging section 4 (step S109). Next, the controller 60 acquires information indicating the position and the posture of the identified apparatus unit 1, on the basis of a captured image obtained by the imaging section 4 (step S110).

Next, the controller 60 generates the correction data Dc concerning an image, from the information indicating the position and the posture (step S111). Next, the controller 60 outputs the correction data Dc concerning an image, to the projector section 3 of the identified apparatus unit 1 (step S112). Further, the controller 60 generates the correction data Dc concerning a sound, from the information indicating the position and the posture and meta information (step S113). Next, the controller 60 outputs the correction data Dc concerning a sound, to the audio DSP 21 of the identified apparatus unit (step S114). Afterward, the controller 60 returns to the processing in step S101.

(1.2.2 Creation Example of Correction Data (FIG. 21))

FIG. 21 illustrates an example of control operation for image correction in the apparatus unit 1.

It is to be noted that the control operation is described below as an operation performed by the one or more controllers 60 in the plurality of apparatus units 1, using the coupling form in FIG. 19 as an example. However, in the case of the coupling form in FIG. 24 described later, the control operation may be an operation performed by the data conversion section 81. Further, in the case of the coupling form in FIG. 27 described later, the control operation may be an operation performed by the controller 60 in the apparatus unit 1-3 that serves as the master.

The controller 60 starts the geometric calibration processing (step S200). The controller 60 acquires an internal variable and an external variable of the imaging section 4 and the projector section 3, as preprocessing (step S201). Here, as the internal variable and the external variable, there is, for example, information such as focus and lens distortion of an imaging lens that constitutes the imaging section 4. In addition, there is information indicating a relative positional relationship between the imaging section 4 and the projector section 3. Next, on the basis of the captured image obtained by the imaging section 4, a posture of the projector section 3 is estimated (step S202), and the controller 60 acquires information indicating the posture of the projector section 3 (step S203). Next, on the basis of the information indicating the posture, the controller 60 performs geometric-correction-information generation processing (step S204), and acquires data of geometric correction information (step S205). The controller 60 outputs the data of the geometric correction information to the projector section 3. In the projector section 3, on the basis of the data of the geometric correction information, geometric correction processing is performed for an input image Dv1 (step S206).

Meanwhile, the controller 60 starts the luminance/color calibration processing (step S300). The controller 60 acquires information indicating luminance/color properties of the projector section 3, as preprocessing (step S301). Next, on the basis of the information indicating the luminance/color properties and the information indicating the posture of the projector section 3, the controller 60 performs luminance/color-correction-information generation processing (step S302), and acquires data of luminance/color correction information (step S303). The controller 60 outputs the data of the luminance/color correction information to the projector section 3. In the projector section 3, the luminance/color correction processing is performed for a geometric correction image Dv2 after the geometric correction processing (step S304). As a result, a luminance/color correction image Dv3 is obtained.

[1.3 Other Configuration Examples]

(1.3.1 Second Configuration Example of Control System of Apparatus Unit)

FIG. 22 illustrates a second configuration example of the control system of the apparatus unit 1.

The second configuration example illustrated in FIG. 22 further includes a video processor 70, an input switching section 71, an internal memory 72, and an internal I/F section 73, with respect to the first configuration example in FIG. 18.

The input data Day are inputted to the controller 60, through the LAN I/F section 52 and the memory I/F section 53. The input switching section 71 selectively switches between the input data Day supplied from the wired I/F section 51 and the input data Day supplied from the controller 60.

The input data Day are inputted to the video processor 70, through the input switching section 71. In addition, data necessary for generation of the correction data Dc of various kinds are inputted to the video processor 70, through the internal I/F section 73.

The video processor 70 generates the correction data Dc concerning an image, and outputs the generated correction data Dc, together with the image data Dv, to the projector section 3.

Further, the video processor 70 generates the correction data Dc concerning a sound, and outputs the generated correction data Dc, together with the sound data Da, to the speaker section 2.

Other configurations may be substantially similar to the first configuration example in FIG. 18.

(1.3.2 Second to Sixth Examples of Coupling Form of Apparatus Units)

(Second Example of Coupling Form)

FIG. 23 illustrates a second example of a coupling form in a case where the plurality of apparatus units 1 are combined. FIG. 23 illustrates an example in which the projection screens 10-1, 10-2, 10-3, and 10-4 provided, respectively, by the four apparatus units 1-1, 1-2, 1-3, and 1-4 are combined, to display, for example, one projection screen of 4K/60P (4K@60P).

The coupling form in FIG. 23 is an example in which the four apparatus units 1-1, 1-2, 1-3, and 1-4 are coupled, for example, in a daisy chain, by the wired I/F section 51. For the wired I/F section 51, it is possible to use, for example, a CEC line of HDMI, an external channel line of DP (Display Port), etc. In this coupling form, for example, the input data Day of 4K/60P (4K@60P) are inputted to one apparatus unit 1-1. The input data Day of 4K/60P (4K@60P) is also inputted to other apparatus units 1-2, 1-3, and 1-4 in the daisy chain mode.

The image correction processing such as the geometric calibration processing and the luminance/color calibration processing, and the screen division processing, etc. are performed in each of the apparatus units 1-1, 1-2, 1-3, and 1-4. The apparatus units 1-1, 1-2, 1-3, and 1-4 share the correction data Dc to perform the image correction processing, etc., in the daisy chain mode.

The apparatus units 1-1, 1-2, 1-3, and 1-4 each project, for example, an image of 1080/60P (1080@60P) obtained by dividing an image of 4K/60P (4K@60P).

(Third Example of Coupling Form)

FIG. 24 illustrates a third example of a coupling form in a case where the plurality of apparatus units 1 are combined. FIG. 24 illustrates an example in which the projection screens 10-1, 10-2, 10-3, and 10-4 provided, respectively, by the four apparatus units 1-1, 1-2, 1-3, and 1-4 are combined, to display, for example, one projection screen of 4K/60P (4K@60P).

In the coupling form in FIG. 24, the data conversion section 81 coupled to each of the apparatus units 1-1, 1-2, 1-3, and 1-4 is provided. For example, data of 4K/60P (4K@60P) are inputted to the data conversion section 81, as the input data Day to be base data. In addition, the imaging data Di obtained by the imaging section 4 in each of the apparatus units 1-1, 1-2, 1-3, and 1-4 are inputted to the data conversion section 81.

The image correction processing such as the geometric calibration processing and the luminance/color calibration processing, and the screen division processing, etc. are performed in the data conversion section 81.

For example, data of 1080/60P (1080@60P) obtained by division performed by the data conversion section 81 are inputted, as the input data Day, to each of the apparatus units 1-1, 1-2, 1-3, and 1-4. The apparatus units 1-1, 1-2, 1-3, and 1-4 each project, for example, an image of 1080/60P (1080 @60P).

(Fourth Example of Coupling Form)

FIG. 25 illustrates a fourth example of a coupling form in a case where the plurality of apparatus units 1 are combined. FIG. 25 illustrates an example in which the projection screens 10-1 to 10-4 and 10-5 to 10-8 provided, respectively, by the eight (4×2) apparatus units 1-1 to 1-4 and 1-5 to 1-8 are combined, to display, for example, one projection screen of a resolution of 4K/60P (4K@60P)×2.

In the coupling form in FIG. 25, in a manner substantially similar to the coupling form in FIG. 24, the data conversion section 81 coupled to the four apparatus units 1-1, 1-2, 1-3, and 1-4 is provided. Further, in this coupling form, other data conversion section 81A coupled to the other four apparatus units 1-5, 1-6, 1-7, and 1-8 is provided. The data conversion section 81 and the other data conversion section 81A are coupled to each other.

For example, data of 4K/60P (4K@60P) are inputted to the data conversion section 81, as the input data Day to be base data. In addition, the imaging data Di obtained by the imaging section 4 in each of the four apparatus units 1-1, 1-2, 1-3, and 1-4 are inputted to the data conversion section 81.

The data of the input data Day to be the base data are inputted to the other data conversion section 81A through the data conversion section 81. In addition, the imaging data Di obtained by the imaging section 4 in each of the other four apparatus units 1-5, 1-6, 1-7, and 1-8 are inputted to the other data conversion section 81A.

The image correction processing such as the geometric calibration processing and the luminance/color calibration processing, and the screen division processing, etc. are performed in the data conversion section 81 and in the other data conversion section 81A.

For example, data of 1080/60P (1080@60P) obtained by division performed by the data conversion section 81 are inputted, as the input data Day, to the four apparatus units 1-1, 1-2, 1-3, and 1-4. The four apparatus units 1-1, 1-2, 1-3, and 1-4 each project, for example, an image of 1080/60P (1080 @60P).

Similarly, for example, data of 1080/60P (1080@60P) obtained by division performed by the other data conversion section 81A are inputted, as the input data Day, to the other four apparatus units 1-5, 1-6, 1-7, and 1-8. The other four apparatus units 1-5, 1-6, 1-7, and 1-8 each project, for example, an image of 1080/60P (1080@60P).

(Fifth Example of Coupling Form)

FIG. 26 illustrates a fifth example of a coupling form in a case where the plurality of apparatus units 1 are combined. FIG. 26 illustrates an example in which the projection screens 10-1, 10-2, 10-3, and 10-4 provided, respectively, by the four apparatus units 1-1, 1-2, 1-3, and 1-4 are combined, to display, for example, one projection screen of 4K/60P (4K@60P).

In this coupling form, a data server 82 coupled to each of the apparatus units 1-1, 1-2, 1-3, and 1-4 is provided. For example, the input data Day of 4K/60P (4K@60P) are inputted to each of the apparatus units 1-1, 1-2, 1-3, and 1-4, through the data server 82. The apparatus units 1-1, 1-2, 1-3, and 1-4 are coupled to one another by, for example, the LAN I/F section 52 wirelessly. Further, each of the apparatus units 1-1, 1-2, 1-3, and 1-4 and the data server 82 are coupled to each other by, for example, the LAN I/F section 52 wirelessly.

The image correction processing such as the geometric calibration processing and the luminance/color calibration processing, and the screen division processing, etc. are performed in each of the apparatus units 1-1, 1-2, 1-3, and 1-4. The apparatus units 1-1, 1-2, 1-3, and 1-4 share the correction data Dc to perform the image correction processing, etc.

The apparatus units 1-1, 1-2, 1-3, and 1-4 each project, for example, an image of 1080/60P (1080@60P) obtained by dividing an image of 4K/60P (4K@60P).

(Sixth Example of Coupling Form)

FIG. 27 illustrates a sixth example of a coupling form in a case where the plurality of apparatus units 1 are combined. FIG. 27 illustrates an example in which the projection screens 10-1, 10-2, 10-3, and 10-4 provided, respectively, by the four apparatus units 1-1, 1-2, 1-3, and 1-4 are combined, to display, for example, one projection screen of 4K/60P (4K@60P).

FIG. 27 illustrates a coupling form in which the apparatus units 1-1, 1-2, and 1-4 are slaves and the apparatus unit 1-3 is a master. The image correction processing such as the geometric calibration processing and the luminance/color calibration processing, and the screen division processing, etc. are performed in the apparatus unit 1-3 serving as the master. Further, the apparatus units 1-1, 1-2, 1-3, and 1-4 may share the correction data Dc to perform the image correction processing, etc., and the image correction processing may be performed for each of the apparatus units 1-1, 1-2, 1-3, and 1-4.

In this coupling form, the data server 82 coupled to the apparatus unit 1-3 serving as the master is provided. The apparatus units 1-1, 1-2, 1-3, and 1-4 are coupled to one another by, for example, the LAN I/F section 52 wirelessly. In addition, the apparatus unit 1-3 serving as the master and the data server 82 are coupled to each other by, for example, the LAN I/F section 52 wirelessly.

For example, the input data Day of 4K/60P (4K@60P) are inputted to the apparatus unit 1-3 serving as the master, through the data server 82. For example, the input data Day of 1080/60P (1080@60P) obtained by dividing an image of 4K/60P (4K@60P) are inputted from the apparatus unit 1-3 serving as the master, to the apparatus units 1-1, 1-2, and 1-4 each serving as the slave.

The apparatus units 1-1, 1-2, 1-3, and 1-4 each project, for example, an image of 1080/60P (1080@60P) obtained by dividing the image of 4K/60P (4K@60P).

[1.4 Effects]

As described above, according to the present embodiment, the speaker section 2, the projector section 3, and the imaging section 4 are included in the one apparatus unit 1, and the sound output state of the speaker 20 is controlled on the basis of the information indicating the installation state of the apparatus unit 1. The information is estimated on the basis of the captured image obtained by the imaging section 4. It is therefore possible to achieve a new use form of the projector.

According to the present embodiment, effects such as an increase in resolution, increases in angle of view and aspect ratio, and an increase in luminance of display are obtained as image-centered added values, by using the plurality of apparatus units 1. Further, effects in terms of sound are obtained by appropriately combining the plurality of speakers 20 in the plurality of apparatus units 1. For example, it is possible to increase a sound pressure level, by the number of the combined speakers 20. Moreover, in a case where the line-array speaker groups are configured as illustrated in FIG. 14, effects such as less attenuation of sound, a small difference in sound level between inside and outside of an area, and less occurrence of howling are expected. Meanwhile, it is possible to provide a system configuration assuming the multi-speaker placement in the surround system as illustrated in FIG. 12, in viewing contents such as movies. This makes it possible to achieve a configuration that allows for a system configuration that reflects a perspective underlined by a user during viewing.

It is to be noted that the effects described herein are mere examples without being limitative, and other effects may also be provided.

<2. Other Embodiments>

The technique based on the disclosure is not limited to the description of the above-described embodiments, and may be modified in a variety of ways.

For example, the technology may adopt the following configurations.

(1)
A projection system including:
an apparatus unit that includes a speaker section, a projector section, and an imaging section, the speaker section including one or more speakers, the imaging section imaging a projection screen provided by the projector section; and
a controller that controls a sound output state of the speaker, on a basis of information indicating an installation state of the apparatus unit, the information being estimated on a basis of a captured image obtained by the imaging section.

(2)
The projection system according to (1), in which the controller estimates information indicating at least a position and a posture of the apparatus unit, as the information indicating the installation state.

(3)
The projection system according to (1) or (2), in which the apparatus unit includes a plurality of apparatus units, and
the projection screens provided by the respective projector sections in the plurality of apparatus units are joined to form one composite screen.

(4)
The projection system according to (3), in which the controller estimates information indicating at least relative positions among the plurality of apparatus units, as the information indicating the installation state.

(5)
The projection system according to (3) or (4), in which the controller controls two or more of the speakers provided in adjacent two or more of the apparatus units, to serve as one speaker group having a same sound output state.

(6)
The projection system according to any one of (3) to (5), in which the controller controls the speaker of each of the plurality of apparatus units, to belong to any of a plurality of speaker groups having sound output states different from each other.

(7)
The projection system according to (6), in which the plurality of speaker groups include a center speaker group, a left speaker group, and a right speaker group.

(8)
The projection system according to any one of (3) to (5), in which the controller controls all speakers of two or more of the apparatus units adjacent in a lateral direction, to serve as one line-array speaker group having a same sound output state.

(9)
The projection system according to any one of (1) to (8), in which the controller generates correction data for correction of the projection screen provided by the projector section, on a basis of the captured image obtained by the imaging section.

(10)
An apparatus unit including:
a unit main body that includes a speaker section, a projector section, and an imaging section, the speaker section including one or more speakers, the imaging section imaging a projection screen provided by the projector section; and
a controller that controls a sound output state of the speaker, on a basis of information indicating an installation state of the unit main body, the information being estimated on a basis of a captured image obtained by the imaging section.

This application is based upon and claims priority from Japanese Patent Application No. 2015-163744 filed with the Japan Patent Office on Aug. 21, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A projection system, comprising:
a plurality of apparatus units that comprises:
   a plurality of speaker sections that comprises a plurality of speakers;
   a plurality of projector sections configured to:
      project a plurality of projection screens; and
      join the plurality of projection screens as a single composite screen;
   a plurality of imaging sections configured to:
      display the plurality of projection screens; and
      obtain a plurality of images of the plurality of apparatus units; and
   a plurality of controllers configured to:
      determine installation information based on the obtained plurality of images, wherein the installation information includes:
         an installation state of each of the plurality of apparatus units,
         relative positions among the plurality of apparatus units, and
         a parameter group including a parameter that represents a specific numerical value into which the installation state of each of the plurality of apparatus units is converted;
      determine correction data based on the obtained plurality of images;
      control a sound output state of the plurality of speakers based on the installation information; and
      control the plurality of projection screens based on the correction data.

2. The projection system according to claim 1, wherein the plurality of controllers is further configured to estimate a posture of each of the plurality of apparatus units as the installation information.

3. The projection system according to claim 1, wherein the plurality of controllers is further configured to designate, as one speaker group, at least two speakers of at least two apparatus units of the plurality of apparatus units,
the at least two speakers have a same sound output state, and
the at least two apparatus units are adjacent.

4. The projection system according to claim 1, wherein the plurality of controllers is further configured to designate at least one speaker of each of the plurality of apparatus units as one speaker group of a plurality of speaker groups, wherein each of the plurality of speaker groups has different sound output states.

5. The projection system according to claim 4, wherein the plurality of speaker groups include a center speaker group, a left speaker group, and a right speaker group.

6. The projection system according to claim 1, wherein the plurality of controllers is further configured to designate, as one line-array speaker group having a same sound output state, all speakers of at least two apparatus units of the plurality of apparatus units adjacent in a lateral direction.

7. An apparatus unit, comprising:
a unit main body that includes:
   a speaker section that includes at least one speaker;
   a projector section configured to project a projection screen; and
   an imaging section configured to:
      display the projection screen; and
      obtain an image of the unit main body; and
   a controller configured to:
      determine installation information based on the obtained image, wherein the installation information includes:
         an installation state of the unit main body,
         relative position of the unit main body with a plurality of externals apparatus units, and
         a parameter that represents a specific numerical value into which the installation state of the unit main body is converted;
      determine correction data based on the obtained image;
      control a sound output state of the at least one speaker based on the installation information; and
      control the projection screen based on the correction data.

* * * * *